US 9,754,245 B1
Sep. 5, 2017

(12) United States Patent
Davison et al.

(54) PAYMENTS PORTAL

(71) Applicant: Amazon Technologies, Inc., Seattle, WA (US)

(72) Inventors: Alan Greame Davison, Redmond, WA (US); Amitpal Singh Bhutani, Bellevue, WA (US); Justin Michael Bonnar, Seattle, WA (US); Robert Benjamin Brydon, Seattle, WA (US); Bryan Christopher Castillo, Brier, WA (US); Dennis Scott Doctor, Seattle, WA (US); Thomas Luke Kovarik, Woodinville, WA (US); Aatish Suresh Mandelecha, Seattle, WA (US); John Matthew Nienart, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 13/797,384

(22) Filed: Mar. 12, 2013

Related U.S. Application Data

(60) Provisional application No. 61/765,135, filed on Feb. 15, 2013.

(51) Int. Cl.
G06Q 40/00 (2012.01)
G06Q 20/12 (2012.01)

(52) U.S. Cl.
CPC .................... *G06Q 20/12* (2013.01)

(58) Field of Classification Search
CPC ...................................... G06Q 20/12
See application file for complete search history.

(56) References Cited

U.S. PATENT DOCUMENTS

| 5,671,279 | A | 9/1997 | Elgamal |
| 5,724,424 | A | 3/1998 | Gifford |
| 5,757,917 | A | 5/1998 | Rose et al. |
| 5,960,411 | A | 9/1999 | Hartman et al. |
| 6,021,397 | A | 2/2000 | Jones et al. |
| 6,092,053 | A | 7/2000 | Boesch et al. |
| 6,332,134 | B1 | 12/2001 | Foster |
| 7,146,341 | B1 | 12/2006 | Light et al. |

(Continued)

FOREIGN PATENT DOCUMENTS

WO    WO0143033    6/2001

OTHER PUBLICATIONS

U.S. Official Action dated Jul. 22, 2014 in U.S. Appl. No. 13/797,410, filed Mar. 12, 2013, First Named Inventor: Davison.
(Continued)

*Primary Examiner* — Rajesh Khattar
(74) *Attorney, Agent, or Firm* — Lee & Hayes, PLLC

(57) ABSTRACT

Technologies are described herein for a payments portal. A payments portal can be configured to support payments by generating and embedding widgets in webpages hosted by merchant sites associated with a marketplace. The widgets can provide specific payment functionality for users, thereby providing consistent payment experiences across merchant sites without updating the merchant sites. The widgets can be dynamic or static. Interactions with the widgets can cause a browser displaying the widgets to access data hosted by the payments portal and/or other systems, devices or services in communication with the payments portal.

20 Claims, 14 Drawing Sheets

(56) References Cited

U.S. PATENT DOCUMENTS

| | | | |
|---|---|---|---|
| 7,194,437 B1 | 3/2007 | Britto et al. | |
| 7,457,778 B2 | 11/2008 | Li et al. | |
| 7,499,889 B2 | 3/2009 | Golan et al. | |
| 7,502,760 B1 | 3/2009 | Gupta | |
| 7,877,299 B2 | 1/2011 | Bui | |
| 7,966,259 B1 | 6/2011 | Bui | |
| 7,975,019 B1 | 7/2011 | Green et al. | |
| 7,975,020 B1 | 7/2011 | Green et al. | |
| 8,160,935 B2 | 4/2012 | Bui | |
| 8,311,942 B1* | 11/2012 | Mason | 705/40 |
| 8,355,959 B2 | 1/2013 | Bui | |
| 8,370,749 B2 | 2/2013 | Morse et al. | |
| 8,583,915 B1 | 11/2013 | Huang | |
| 8,677,332 B1* | 3/2014 | Hjelmstad et al. | 717/140 |
| 8,726,233 B1* | 5/2014 | Raghavan | 717/113 |
| 2001/0042785 A1 | 11/2001 | Walker et al. | |
| 2002/0072980 A1 | 6/2002 | Dutta | |
| 2002/0099738 A1* | 7/2002 | Grant | 707/513 |
| 2002/0112171 A1 | 8/2002 | Ginter et al. | |
| 2002/0120567 A1 | 8/2002 | Caplan et al. | |
| 2004/0117302 A1 | 6/2004 | Weichert et al. | |
| 2004/0225617 A1 | 11/2004 | Baser et al. | |
| 2005/0091111 A1 | 4/2005 | Green et al. | |
| 2006/0218052 A1 | 9/2006 | Haynes et al. | |
| 2006/0229998 A1 | 10/2006 | Harrison et al. | |
| 2007/0050307 A1 | 3/2007 | Light et al. | |
| 2007/0199053 A1 | 8/2007 | Sandhu | |
| 2007/0203850 A1 | 8/2007 | Singh et al. | |
| 2007/0245022 A1 | 10/2007 | Olliphant et al. | |
| 2007/0271192 A1 | 11/2007 | Brunet et al. | |
| 2008/0033879 A1 | 2/2008 | Blinn et al. | |
| 2008/0098325 A1 | 4/2008 | Williams et al. | |
| 2008/0104496 A1 | 5/2008 | Williams et al. | |
| 2008/0183593 A1 | 7/2008 | Dierks | |
| 2008/0189186 A1 | 8/2008 | Choi et al. | |
| 2008/0270417 A1 | 10/2008 | Roker | |
| 2008/0270909 A1 | 10/2008 | Kaufman et al. | |
| 2009/0216683 A1 | 8/2009 | Gutierrez | |
| 2009/0235149 A1 | 9/2009 | Frohwein | |
| 2009/0249321 A1 | 10/2009 | Mandyam et al. | |
| 2009/0271250 A1 | 10/2009 | Sriver et al. | |
| 2009/0281944 A1 | 11/2009 | Shakkarwar | |
| 2009/0287581 A1 | 11/2009 | Sriver et al. | |
| 2010/0106564 A1 | 4/2010 | Manesh et al. | |
| 2010/0114739 A1 | 5/2010 | Johnston | |
| 2011/0022484 A1 | 1/2011 | Smith et al. | |
| 2011/0085667 A1 | 4/2011 | Berrios et al. | |
| 2011/0191210 A1 | 8/2011 | Blackhurst et al. | |
| 2012/0036048 A1 | 2/2012 | Robb et al. | |
| 2012/0066090 A1 | 3/2012 | Gangapurkar | |
| 2012/0136754 A1 | 5/2012 | Underwood | |
| 2012/0150643 A1 | 6/2012 | Wolfe et al. | |
| 2012/0159635 A1 | 6/2012 | He et al. | |
| 2012/0209735 A1 | 8/2012 | Subramanian et al. | |
| 2012/0254720 A1 | 10/2012 | Hamm et al. | |
| 2012/0290478 A1 | 11/2012 | Crofts et al. | |
| 2013/0151417 A1* | 6/2013 | Gupta | 705/65 |
| 2013/0185164 A1* | 7/2013 | Pottjegort | 705/14.73 |
| 2013/0346302 A1* | 12/2013 | Purves | G06Q 20/102 705/40 |
| 2014/0052617 A1* | 2/2014 | Chawla et al. | 705/39 |
| 2014/0089113 A1* | 3/2014 | Desai et al. | 705/16 |
| 2014/0129430 A1* | 5/2014 | Desai et al. | 705/39 |
| 2014/0129437 A1* | 5/2014 | Desai et al. | 705/41 |
| 2014/0129438 A1* | 5/2014 | Desai et al. | 705/41 |

OTHER PUBLICATIONS

U.S. Official Action dated Sep. 16, 2014 in U.S. Appl. No. 13/797,357, filed Mar. 12, 2013, First Named Inventor: Davison.
U.S. Official Action dated Feb. 24, 2014 in U.S. Appl. No. 13/797,410, filed Mar. 12, 2013, first named inventor: Davison.
U.S. Appl. No. 12/236,285, filed Sep. 23, 2008, Kuruvila.
U.S. Appl. No. 12/265,523, filed Nov. 5, 2008, Agrawal.
U.S. Appl. No. 12/265,554, filed Nov. 5, 2008, Agarwal.
U.S. Appl. No. 13/094,774, filed Apr. 26, 2011, Murti.
U.S. Appl. No. 13/797,357, filed Mar. 2013, Davison.
U.S. Appl. No. 13/797,410, filed Mar. 12, 2013, Davison.
U.S. Official Action dated Apr. 18, 2011 in U.S. Appl. No. 12/236,285, filed Sep. 23, 2008, First Named Inventor: Vinay Kuruvila.
U.S. Official Action dated Oct. 28, 2011 in U.S. Appl. No. 12/236,285, filed Sep. 23, 2008, First Named Inventor: Vinay Kuruvila.
U.S. Official Action dated Apr. 15, 2011 in U.S. Appl. No. 12/265,523, filed Nov. 5, 2008, First Named Inventor Ashish Agrawal.
U.S. Official Action dated Nov. 20, 2011 in U.S. Appl. No. 12/265,523, filed Nov. 5, 2008, First Named Inventor Ashish Agrawal.
U.S. Official Action dated Dec. 14, 2010 in U.S. Appl. No. 12/265,554, filed Nov. 5, 2008, First Named Inventor Ashish Agrawal.
U.S. Official Action dated May 31, 2011 in U.S. Appl. No. 12/265,554, filed Nov. 5, 2008, First Named Inventor Ashish Agrawal.
U.S. Official Action dated Jun. 4, 2012 in U.S. Appl. No. 12/265,554, filed Nov. 5, 2008, First Named Inventor Ashish Agrawal.
U.S. Official Action dated Sep. 24, 2012 in U.S. Appl. No. 12/265,554, filed Nov. 5, 2008, First Named Inventor Ashish Agrawal.
U.S. Official Action dated Feb. 13, 2013 in U.S. Appl. No. 13/094,774, filed Apr. 26, 2011, First Named Inventor Gautam V. Murti.
"Instabuy Merchant FAQ", Sep. 2, 1999 [online] www.instabuy. com, retrieved from: http//:wwvv.instabuy.com/merchants/merch_faq.html, pp. 1-4.
Cox, B. "NetBill Security and Transaction Protocol" Proceedings of the First USENIX Workshop on Electronic Commerce, Jul. 1995 [online][retrieved on Jun. 19, 2013] retrieved from: htttp://informedia.cs.cmu.edu/documents/netbill.pdf, , pp. 1-12.
Borenstein, N.S., "Perils and Pitfalls of Practical Cybercommerce", Communications of the ACM, vol. 39, No. 6, Jun. 1996 [online][retrieved on Jun. 19, 2013] retrieved from: http://guppylake.com/nsb/pubs/fv-cacm.pdf, pp. 36-44.
Bank of America Corp Files Patent Application for Online Financial Institution Profile Electronic Checkout. (Jan. 16, 2012). Indian Patents News Retrieved on Oct. 30, 2014.
Fiserv Improves Accessibility of Online Bill Payment with Launch of Payment Widget. (Mar. 29, 2010). Business Wire Retrieved on Oct. 30, 2014.
"Mopay" is MindMatics' New Signature Product. Paying for Web Content by Mobile Phone in 60 Countries. (Nov. 19, 2009). Business Wire Retrieved on Oct. 30, 2014.
U.S. Official Action dated Nov. 25, 2014 in U.S. Appl. No. 12/265,523, filed Nov. 5, 2008, First Named Inventor Ashish Agrawal.
Final Office Action for U.S. Appl. No. 13/797,357, mailed on Mar. 20, 2015, Alan Greame Davison, "Payments Portal", 28 pages.
Office Action for U.S. Appl. No. 13/797,410, mailed on Apr. 9, 2015, Alan Greame Davison, "Payments Portal", 15 pages.
U.S. Official Action dated Jul. 8, 2014 in U.S. Appl. No. 12/236,285, filed Sep. 23, 2008, First Named Inventor: Vinay Kuruvila.
U.S. Official Action dated Aug. 9, 2013 in U.S. Appl. No. 13/094,774, filed Apr. 26, 2011, First Named Inventor Gautam V. Murti.
Office action for U.S Appl. No. 13/797,410 mailed on Oct. 15, 2015, Davison et al., "Payments Portal", 18 pages.
Office action for U.S Appl. No. 13/797,357, mailed on Mar. 23, 2016, Davison et al., "Payments Portal", 21 pages.
Office action for U.S Appl. No. 13/797,357 mailed on Oct. 14, 2015, Davidson, "Payments Portal", 30 pages.
Office action for U.S Appl. No. 13/797,357, mailed on Sep. 28, 2016, Davison et al., "Payments Portal ", 19 pages.
Office action for U.S Appl. No. 13/797,410, mailed on Sep. 30, 2016, Davison et al., "Payments Portal", 15 pages.

(56) References Cited

OTHER PUBLICATIONS

Office action for U.S Appl. No. 13/797,410, mailed on Feb. 16, 2017, Davison et al., "Payments Portal", 18 pages.
Office action for U.S Appl. No. 13/797,357, mailed on Feb. 9, 2017, Davison et al., "Payments Portal", 20 pages.

* cited by examiner

```
{
 instrument: {
  // ...
  "brandID": "brandX_card_78714",
  "issuerID": "first_bank_of_townY_1478511",
 },
 // ...
 strings: {
  "brandX_card_78714": null,
  "first_bank_of_townY_1478511": null
  // ...
 }
}
```

FIG. 12A

```
{
 instrument: {
  // ...
  "brandID": "brandX_card_78714",
  "issuerID": "first_bank_of_townY_1478511",
 },
 // ...
 strings: {
  "brandX_card_78714": "BrandXCard",
  "first_bank_of_townY_1478511": "Première Banque de Ville Y",
  // ...
 }
}
```
← 1200

FIG. 12B

Greetings, <%= user 124_name %>.
<$ if (in_treatment('SECRET_PROJECT_TEST')) { $>
 Click here to try the Company's newest innovation.
<$ } $>

```
<html>
<script>
Greetings, <%=user 124_name %>
</script>
</html>
```

PAYMENTS PORTAL

CROSS-REFERENCE TO RELATED APPLICATION

This application claims priority to U.S. Provisional Patent Application No. 61/765,135 entitled "Payments Portal," filed Feb. 15, 2013, which is incorporated herein by reference in its entirety.

BACKGROUND

An increase in the number of payment methods combined with increasing complexity and number of business models has increased the number of changes required in merchant and/or marketplace payment systems and pipelines, as well as in customer interfacing contact points with these systems and pipelines. Within some marketplace sites (e.g., a number of merchant sites that may collectively form an electronic marketplace), several teams may duplicate user interfaces ("UIs") and integration work for integrating ordering and payment functionality. The combination of these factors can increase the cost of implementing new payment methods and/or may slow the adoption of the new payment methods.

These and other challenges may complicate payment systems and/or adoption of new payment methods by clients. As used herein, "clients" can refer to particular merchant sites or merchant site servers (also referred to herein as "client sites") that may be associated with a marketplace. These clients may support varying subsets of available payment methods with varying user interfaces. As such, some preferred payment methods may not be available uniformly across the marketplace and/or merchant sites.

BRIEF DESCRIPTION OF THE DRAWINGS

FIGS. 12A-B illustrate aspects of string localization, according to one illustrative embodiment.

DETAILED DESCRIPTION

Figure 1:
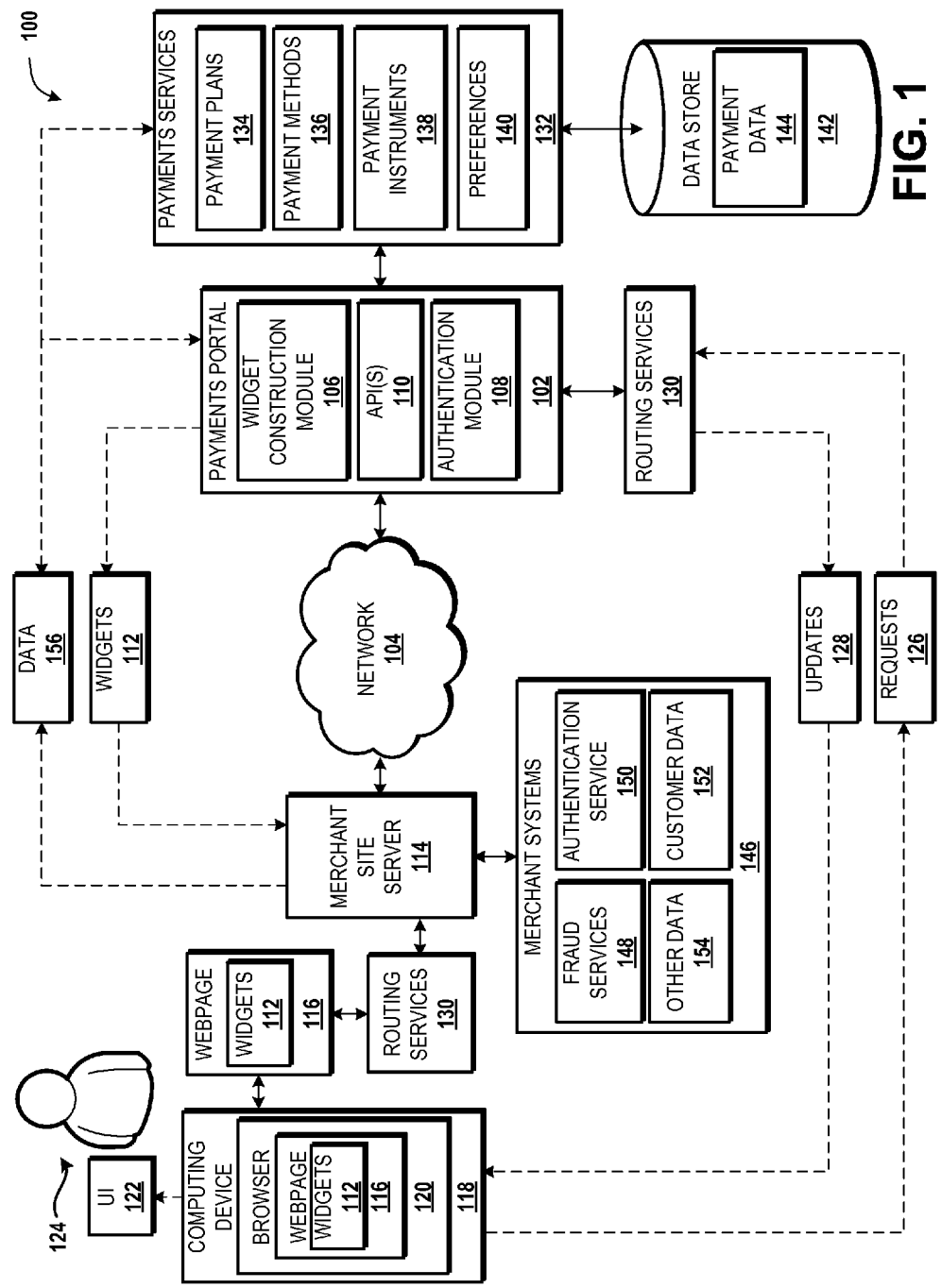
FIG. 1 is a system diagram showing aspects of a payment, according to one illustrative embodiment.

The following detailed description is directed to a payments portal. According to various implementations, a payments portal can be hosted or executed by one or more computing platforms such as, for example, a computing device or a cloud or distributed computing system. As such, the payments portal can be operated as an application or service. In some embodiments, the payments portal is executed as a service for generating, storing, and/or serving embeddable code and/or scripts such as widgets, or the like, for providing various payment functionality to one or more clients of the payments portal. The payments portal can be owned and/or operated by any entity such as, for example, a marketplace site such as Amazon.com, and the clients can include, but are not limited to, one or more merchant sites such as Zappos.com, or the like. It should be understood that this example is illustrative, and should not be construed as being limiting in any way.

According to various embodiments, an entity associated with a merchant site ("client") can create a website or other platform for providing an e-commerce or merchant site. The merchant site can offer goods and services and accept orders and payments for the goods and services. According to some embodiments, clients can configure the website to include one or more widgets associated with the payments portal. As used herein, a "widget" can refer to a UI component that includes structure, data, and control flow handling for providing functionality in a webpage or web environment. According to various embodiments, widgets can refer to combinations of HTML and JavaScript embedded in a hosting page. A "dynamic widget" can refer to a widget that uses JavaScript to make Ajax requests to the payments portal APIs. Customer actions in a dynamic widget can be communicated via JavaScript listeners or service handler URIs. A "static widget" can refer to a widget that does not include JavaScript for providing core functionality of the widget and/or a widget that may not communicate with the payments portal.

The widgets can be embedded in the website and can provide various payment functionality for a customer or other user of the merchant site. Because the widgets can be embedded in the website, the widgets can be maintained by the payments portal and updated by the payments portal. Also, the widgets can be released and/or updated, and entirely new payment methods and/or functionality can be released or updated, without merchant sites changing code or even restarting one or more systems powering the merchant site. Thus, the widgets can be updated without updating merchant sites.

According to various implementations of the concepts and technologies disclosed herein, the widgets provided by the payments portal can support rich browser environments capable of executing client-side code and/or scripts such as JavaScript, or the like. The widgets provided by the payments portal also can be embedded in and/or executed by other browser environments that are configured not to execute JavaScript and/or other client-side executable code. Thus, the widgets can include or exclude JavaScript and/or other client-side code and still provide a consistent payments and ordering experience for customers of the clients. The payments portal also can interact with non-HTML and/or non-widget clients such as video devices, reading devices, set-top boxes, embedded computer systems, combinations thereof, or the like.

The payments portal also can support consolidation of payment functionality across various payment pipelines under common management and control. In some instances, a payments portal may provide uniform payment method offerings across multiple merchant sites and/or pipelines. Uniform payment method offerings can help ensure a consistent, customer-centric payments experience.

The payments portal can be used to offer a complete API covering the creation and manipulation of payment domain resources such as payment instruments, payment plans and payment preferences, and a collection of integration widgets. These payment domain resources may be reusable across clients that have a web-based customer interface. This approach can be used to provide clients of the payments portal with the ability to access features supported by the payments portal. The payments portal therefore can be used to improve payment method availability across order pipelines, as well as providing a consistent customer payments experience to customers of multiple clients.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not necessarily drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows aspects of an illustrative payment system 100 that includes a payments portal 102 operating as a part of and/or in communication with a communications network ("network") 104. While the payments portal 102 is illustrated as a unitary block in FIG. 1, it will be appreciated from the description herein that the payments portal 102 can be hosted by one or more computing devices. In the illustrated embodiment, the payments portal 102 is hosted on a distributed computing platform such as a sever farm used to host cloud services. It should be understood that this embodiment is illustrative, and should not be construed as being limiting in any way.

The payments portal 102 can execute an operating system (not illustrated) and one or more application programs for providing the functionality described herein. The operating system is an executable program for controlling operations of the one or more devices used to host the payments portal 102. In the illustrated embodiment, the application programs can include, but are not limited to, a widget construction module 106 and an authentication module 108. It should be understood that the functionality of the widget construction module 106 and the authentication module 108 can be provided by services or devices external to the payments portal 102.

The authentication module 108 can be configured to support various authentication functionality associated with the payments portal 102. For example, the authentication module 108 can be configured to support authentication of one or more users, websites, services, devices, combinations thereof, or the like with the payments portal 102 to determine if the authenticated entity is entitled to access functionality associated with the payments portal 102 as described herein. The authentication module can be configured to authenticate users using cookies, tokens, userIDs and/or passwords, and/or other information as will be described in more detail below. It should be understood that these embodiments are illustrative, and should not be construed as being limiting in any way.

The payments portal 102 also can be configured to expose one or more application programming interfaces ("APIs") 110. The APIs 110 can be accessed by various devices in communication with the payments portal 102 to access the functionality described herein for the payments portal. The APIs 110 can support various protocols for various devices. In some embodiments, the APIs 110 include a hypertext transfer protocol ("HTTP") API that can support, among others, representational state transfer ("REST") client-server communications. These and other aspects of the APIs 110 will be described in additional detail below. Because the APIs 110 can support other types of communications, it should be understood that this embodiment is illustrative and should not be construed as being limiting in any way.

According to various embodiments, the payments portal 102 can be configured to expose a single, uniform RESTful HTTP API to callers, including Ajax requests from browsers, interactions with mobile clients, interactions with client services, or the like. The payments portal 102 can use the single HTTP interface to support uniform resource naming and addressing and straightforward request rerouting. Data in requests or responses can be in JSON format, in some embodiments. The API 110 can be configured to support high availability use cases during checkout and can be a high availability service.

The widget construction module 106 can be configured to perform various functions described herein for generating dynamic and/or static user interface ("UI") widgets ("widgets") 112. As used herein, a "widget" and/or variants thereof can be used to refer to a block of code, a script, and/or other software, applications, or applets for supporting various functionality. As used herein, a "dynamic widget" can refer to a widget 112 that is scripted or coded in one or more updatable and/or executable languages such as JAVA script, VBScript, or the like.

The widgets 112 can be embedded in a webpage 116, for example webpages 116 associated with one or more merchant sites hosted or provided by one or more merchant site servers 114, to manage payments domain resources, such as payment instruments, payment plans, and payment preferences. As used herein, a "merchant site server" can refer to a server or other device configured to store or host a website, service, or application associated with an e-commerce site that is associated with and/or a component of a marketplace site. Because the merchant site servers 114 can host and/or store other types of websites, services, and/or applications, it should be understood that this embodiment is illustrative, and should not be construed as being limiting in any way.

The widgets 112 can be generated by the payments platform 102 and provided to a merchant site server 114 as HTML to be embedded in a webpage 116. The widgets 112 may be dynamic, using JavaScript to provide a rich Ajax experience, or the widgets 112 may be static, supporting devices with no or inadequate JavaScript implementations. A widget 112 can fully encapsulate particular payment functionality and can interact with the merchant site server 114 to initiate multi-step activities or customer workflows.

A dynamic widget can be configured to respond to user interactions by fetching additional code, scripts, or other data and dynamically updating the widget 112 within the webpage or other environment in which the widget 112 is embedded or referenced. As such, it can be appreciated that the dynamic widgets 112 can be supported in various environments such as, but not limited to, LINUX-based web environments, .ASP sessions and/or environments, combinations thereof, or the like. Because dynamic widgets can be used in other environments, it should be understood that these embodiments are illustrative, and should not be construed as being limiting in any way.

In some cases, a client such as the computing device 118 may not be capable and/or may wish not to use a dynamic widget 112. For example, a browser 120 may be configured to disable JavaScript, the client may not support script execution, a security policy may block execution of scripts, the browser 120 may predate standard support, or the like. In these and other cases, the merchant site server 114 can request a static widget 112.

A static widget 112 can be generated without Ajax and/or other scripting capabilities. As such, interactions with the widget 112 can result in loading and/or reloading an entire webpage 116 in the browser 120. These actions can pass through the merchant site server 114. Some static widgets 112 may incorporate some JavaScript to provide progressive enhancement of the user experience when available. As such, a static widget 112 may include some scripts, but in some embodiments, these scripts may not be related to payment functionality associated with the widgets 112. While the widgets 112 are described herein as providing functionality associated with a payment system and/or the payments portal 102, it should be understood that the widgets 112 described herein can be used to support additional and/or alternative functionality. As such, it should be understood that this embodiment is illustrative and should not be construed as being limiting in anyway.

As will be described in additional detail below, particularly with reference to FIGS. 2-11, the widgets 112 can be generated by the widget construction module 106 and/or other functionality associated with the payments portal 102 on demand and/or in response to one or more requests. The widget construction module 106 can be configured to provide the widgets 112 to one or more computer systems associated with the merchant site servers 114.

The merchant site servers 114 can be configured to obtain the widgets 114, and to incorporate the widgets 114 into one or more webpages 116. As is generally understood, a computing device 118 can download the webpage 116, which can incorporate and/or reference the widgets 112, and render the webpage 116 and the widgets 112 using a browser 120 or other application program executed by the computing device 118. The rendered webpage 116 and the embedded and/or referenced widgets 112 can be presented or displayed via one or more user interfaces ("UIs") 122 for a user 124 or other entity.

The user 124 or other entity can interact with the webpage 116 and/or widgets 112 presented by the computing device 118. As explained above, the widgets 112 can include dynamic and/or static widgets that, in response to detecting interactions by the user 124, can generate one or more requests 126 for updates 128 for the webpage 116 and/or the widgets 112. The requests 126 can include POST and/or GET commands and/or update requests generated by various scripts or code blocks such as JAVA script, or the like. As such, the updates 128 can include data that, when rendered by the browser 120, causes the computing device 118 to update the widget 112, the webpage 116, and/or other data. These and other aspects of requesting and obtaining updates for webpages 116 and/or widgets 112 are described in detail below.

The payments portal 102 also can support, access, and/or include an application, service, and/or functionality ("routing services") 130 for routing requests and/or providing a proxy for use in routing requests to and/or from the payments portal 102 and/or systems, services, and/or devices in communication with the payments portal 102. The routing services 130 also can be used to route information and/or requests between the merchant site server 114 and the computing device 118, as shown. With regard to routing provided by the routing services 130, the routing services 130 can be used to map specific URLs to configurable endpoints. This mapping can be used to encapsulate and decouple clients from the internal architecture and service boundaries inside the payments portal 102. Thus, from the perspective of the merchant site server 114, a single API such as the API 110 can appear to be used for communication with the payments portal 102. The routing services 130 also can provide additional security and operational benefits, which can allow operators to securely address a browser same-origin policy, to throttle and prioritize traffic, to mitigate DOS attacks and to blacklist external threats. Because the routing services 130 can be used to provide additional and/or alternative benefits, it should be understood that these embodiments are illustrative, and should not be construed as being limiting in any way.

Embodiments of the concepts and technologies disclosed herein also can make HTTP API calls to access functionality associated with the payments portal 102. The HTTP API calls can be routed to the payments portal 102 and/or other devices or services in communication with the payments portal 102 by the routing services 130. As used herein, "internal payment services" can be used to refer to payment resources such as systems, services, and/or data stores that are part of a marketplace and/or that are behind a marketplace firewall. It should be understood that this embodiment is illustrative, and should not be construed as being limiting in any way.

As mentioned above, some embodiments of the payments portal 102 use a RESTful HTTP API to provide the functionality of at least one of the APIs 110. This can allow use of the routing services 130 to route requests between an external site and destinations behind a marketplace firewall. The routing services 130 can provide routing for internal services as well as external callers such as browsers 120 and mobile clients. The routing services 130 also can perform domain forwarding and renaming, which may be used to allow widgets 112 to function on pages from other domains. The routing provided by the routing services 130 can also be used to route internal requests for the payment system 100.

Implementation of the payments portal 102 may not be identical in all cases. In particular, some behaviors of the payments portal 102 may not be exposed for particular business or legal reasons in some markets; branding may vary for different business units; a customized look-and-feel may be used to integrate the payments portal 102 into some webpages 116, or the like. Additionally, the widgets 112 may be specialized or localized for different locales, in an attempt to ensure that text and images are consistent with a language, location, associated client pipeline, or the like.

The payments portal 102 also can interact with one or more payments services 132 associated with the payments portal. The payments services 132 can include applications, modules, services, and/or data for providing and/or managing various aspects of payments for the payments portal. In particular, the payments services 132 can include one or more services for creating and/or managing payment plans 134, one or more payment methods 136, one or more payment instruments 138, one or more preferences 140, and/or other data and/or functionality (not illustrated in FIG. 1). As used herein, a "payment plan" such as the payment plans 134 can refer to a plan for how to execute payment activity as well as the plan executed against when a payment is processed. As used herein, a "payment method" such as the payment methods 136 can refer to one or more methods of payment used in a transaction. As used herein, "payment instruments" such as the payment instruments 138 can refer to one or more credit cards, checking accounts, or the like. As used herein, "preferences" such as the preferences 140 can refer to customer and/or business rules for creating and/or executing payment plans.

In some embodiments, a payment plan service can be provided and/or accessed by the payment system 100 for use in constructing the payment plans 134 to ensure consistency in the formation and validation of the payment plans 134. In one implementation, the payment plan service can be stateless and can store the payment plans 134 within various data storage devices. The payment plans 134 can be exposed by reference through one or more APIs 110 associated with the payments portal 102. The payments portal 102 also can expose payment plan creation capabilities through the APIs 110 and the widgets 112. Execution of the payment plans 134 can include steps or operations for executing a particular payment transaction against the given payment plan 134 within the context of an individual purchase, for example payment for goods, services, shipment, taxes, or the like.

The payment services 132 also can be used to support other payments functionality, for example, supporting calls to an address service, storing payment methods 136 or enabling calls to payment methods management services, storing payment plans 134, enabling calls to promotion handling services, registering payment instruments 138, maintaining preferences such as the preferences 140, other functions, or the like. Some of the payments services 132 can expose some or all of their functionality via the APIs 110 of the payments portal 102. Some of the payment services 132 may be hidden from clients of the payments portal 102.

According to various implementations of the payment system 100, users 124 also can manage the payment plans 134. In particular, users 124 can establish or manipulate the payment plans 134, specify what payment instruments 138 are eligible for use on particular purchases based upon various constraints of the marketplace and/or other considerations and define or identify preferences 140 that may exist for particular payment plans 134, payment methods 136, and payment instruments 138. According to some embodiments of the concepts and technologies disclosed herein, some ordering pipelines may construct payment plans 134 and submit the payment plans 134 as part of execution requests. As such, the payment plans 134 may be created during a payment pipeline and/or may be submitted directly to the payment systems 132. Because the payment plans 134 may be created and/or submitted instead via a payment plan service with various requests, it should be understood that this embodiment is illustrative, and should not be construed as being limiting in any way.

A payment instrument 138 can include a specific instance of a given payment method 136 such as a particular credit card or a particular bank account. Users 124 can register payment instruments 138 via the payments portal 102 and supply data used for the successful execution of a financial transaction. Some of this information may be confidential and as such, the payment system 100 can provide secure registration and storage of payment methods 136, payment instruments 138, payment plans 134, addresses, and/or other information. Although not shown in FIG. 1, it should be understood that the payments portal 102 can communicate with other non-payments services and/or devices such as, for example, promotion services, loyalty services, address services, rewards services, third-party data and/or services, shipping services, order tracking and/or shipping tracking services, payments services, non-payments services, combinations thereof, or the like. Users 124 also may view, update or delete payment instruments 138. The payments portal 102 can be configured to expose these and other payment instrument management capabilities through HTTP service APIs such as the APIs 110 and/or via one or more widgets 112. Some example embodiments of exposing payments-related data to users 124 via widgets 112 are illustrated and described in more detail below, particularly with reference to FIGS. 2-10.

The preferences 140 can include rules describing uses and/or constraints for payment methods 136 or other payments related behavior. The preferences 140 can be used during construction of the payment plans 134 and/or to streamline user 124 interactions. Instead of distributing preferences 140 through many systems, the concepts and technologies disclosed herein can be used to store and use the preferences 140 to simplify creation of payment plans 134. The preferences 140 may be exposed via the APIs 110 and/or the widgets 112.

The payments services 132 also can be configured to include and/or access a data store 142. According to various implementations, the functionality of the data store 142 can be provided by one or more memory devices, servers, databases, mass storage devices and/or other stand-alone, networked and/or cloud-based data storage devices. The data store 142 can be configured to store payment data 144. The payment data 144 can include payment transaction data, as well as various types of data associated with the payment services 132. Thus, for example, the payment data 144 can include data associated with the payment plans 134, the payment methods 136, the payment instruments 138, the preferences 140, and/or the like. It should be understood that this embodiment is illustrative, and should not be construed as being limiting in any way.

As shown in FIG. 1, the payment system 100 also can include one or more merchant systems 146. The merchant systems 146 can be accessed and/or used by the merchant site server 114 to support various payment functionality for the merchant site server 114. It can be appreciated that the functionality described herein for the payments portal 102 can be used to supplement and/or as a substitute for the merchant systems 146. As such, the merchant systems 146 may be omitted in some embodiments of the concepts and technologies described herein.

The merchant systems 146 can include, but are not limited to, fraud services 148 and/or authentication services 150. The fraud services 148 can be used to detect and/or report fraudulent activities and/or transactions. The authentication services 150 can be used to authenticate users, customers, and/or devices such as the computing device 118 with the merchant site server 114 and/or the merchant systems 146. The merchant systems 146 also can be configured to host and/or store customer data 152 and/or other applications, services, and/or data ("other data") 154. Because the merchant systems 146 can include additional and/or alternative functionality and/or data, it should be understood that this embodiment is illustrative, and should not be construed as being limiting in any way.

The merchant site server 114 also can be configured to provide, obtain, and/or exchange data 156 with the payments portal 102 and/or the payments services 132. As such, the merchant site server 114 can be configured to send and/or receive requests 126 and/or updates 128 directly from the payments portal 102 and/or the payments services 132 instead of, or in addition to, the computing device 118 communicating with the payments portal 102 and/or the payments services 132 via the routing services 130. It should be understood that this embodiment is illustrative, and should not be construed as being limiting in any way.

According to various embodiments, the payments portal 102 disclosed herein is configured to securely store and vend customer payment instrument information, to provide customers with the ability to use various payment methods from business pipelines, to produce a consistent customer experience for payment instrument management, to support payment plan management and payment preference management across multiple merchant site servers 114, to simplify acceptance of new payment methods and platform features by new and existing businesses, and to lower the cost of payments while honoring the payment preferences of customers.

Because the widgets 112 described herein can be encapsulated, customers of the payments portal 102, for example merchant site servers 114, may not be required to have deep knowledge of the payment domain in order to use the payments portal 102 for example, to present payment instrument choices to customers for the formulation and execution of payment plans. Furthermore, the use of the widgets 112 can provide mechanisms to enclose and own from end-to-end the registration and definition of payments resources, which can allow clients or other users to delegate the user interface, interaction workflows and business logic to the payments portal 102. Thus, control flow of payments pipelines can be moved from the merchant site servers 114 to the payments portal 102 via communications directly with the browser 120. It should be understood that this embodiment is illustrative, and should not be construed as being limiting in any way.

The payments portal 102 also can be configured to enable payment methods and functionality for clients. Embodiments of the payments portal 102 disclosed herein can support customer interactions, support passing control between backend systems and user-facing devices, and/or to minimize maintenance required to provide a consistent interface and range of functionality across multiple client sites and/or environments. The payments portal 102 also can reduce entry points to the payments portal 102 to ensure that clients and/or customers are provided with consistent behavior and definitions for resources such as payment plans 134 and minimize maintenance.

The payments portal 102 also can be decoupled from various merchant systems 146 and/or other payment systems. As such, the payments portal 102 can be configured to internalize construction and storage of resources belonging to the payments portal 102. By internalizing construction and storage of the resources, the payments portal 102 can reduce reliance on external infrastructure and minimize coupling with the external systems. The payments portal 102 also is extensible. The payments portal 102 can support extensibility by supporting the addition of new payment methods 136, payment instruments 138 and preferences 140 non-intrusively. Thus, users can adopt improvements without redesigning user interfaces, backend functionality, and/or other aspects of websites.

The payments portal 102 also can support security management for payment systems. The payments portal 102 can manage and/or own components used to support secure intake and processing of sensitive payment data, and can support incremental improvements in security non-intrusively. Owning the customer interaction can allow the payments portal 102 to control, validate and maintain the security mechanisms in place without relying on timely updates by a wide client base, or without having to expend resources to ensure comprehensive compliance across multiple codebases. In addition, the payments portal 102 can reduce burdens of complying with payment related security, auditing requirements and analyses for external teams.

In some embodiments, resources can be identified by uniform resource identifiers ("URIs"), which can enable encapsulation of payments information. When referring to payment instruments, clients may specify a payment method and an ID that varies by method. Thus, clients may be aware of the list of methods and what IDs correspond to the list of methods, which may result in exposing payments internal service boundaries and complicating adoption of new payment methods 136.

The payments portal 102 also can support versioning of the widgets 112. When a merchant site server 114 requests a widget 112, the payment services can determine what version is to be received. Furthermore, the version of a widget 112 can be reflected in the URI of the widget JavaScript and/or as hidden parameters in the HTML forms. Versions of widgets 112 can be configured in various ways. For example, versions can have major and minor version numbers. A major version change can reflect a new capability or change to the size and/or structure of the widget 112. A minor version can reflect a change that does not affect the workflow or layout associated with the widget 112, such as a minor text change, or flipping the default setting of a checkbox. In general, the merchant site servers 114 can receive a latest version of a widget 112. A merchant site server 114 also can specify a version or a maximum version number of the widget 112 to be used, if desired.

Depending upon the design of the merchant site server 114 and how the webpage 116 including the widget 112 is constructed, various activities of a user 124 may result in updating the widget 112, displaying a new webpage 116, refreshing the webpage 116, or updating to part of the webpage 116 (e.g., an Ajax-driven update). For this reason, dynamic widgets 112 may inform the webpage 116, the merchant site server 114, and/or other devices or services of some types of activity such as when an activity or workflow succeeds or completes, when a workflow is under way, when an error occurs, and/or when there is a change in the stored state of an object bound to the widget 112.

If a webpage 116 is to be updated as a result of activity in a widget 112 included in a webpage 116, the update may occur through the browser 120 fetching a new version of the webpage 116 from the merchant site server 114, or by JavaScript acting locally in the webpage 116 to directly update part of the webpage 116 or to make an Ajax request to the merchant site server 114 or other service. The merchant site server 114 also can be configured to pass information as part of the widget context when making a request for a widget 112. The returned widget 112 may incorporate names of JavaScript callback functions and/or URIs of action handlers. In some embodiments, the payments portal 102 can define a JavaScript API through which a dynamic widget 112 can interact with its webpage 116.

Similarly, changes on a webpage 116 may trigger a refresh of the contents of the widget 112. For example, changing the shipping address associated with a purchase may change the set of payment methods 136 and payment instruments 138 eligible for inclusion in a payment plan 134. Dynamic widgets 112 may implement a generic host event listener, and an event sent to the generic host event listener can notify the widget 112 that the widget 112 is to refresh its data from the payments portal 102.

In some embodiments, a dynamic widget 112 can send an event to an action listener of the webpage 116. The action listener can examine the event and decide whether to take an action, refresh the webpage 116, load a different webpage 116, fetch a different widget 112, or the like. If a particular workflow is to continue, or if there has been an error, the event can include the widget 112 state, which can define, for example, what the widget 112 is to look like and what the widget 112 is to contain. Thus, the widget 112 can be recreated if displayed again on a subsequent webpage 116. A workflow continuation may also provide the location of a different widget 112, which the merchant site server 114 can include on the next webpage 116 displayed.

Some action dispositions may result in fetching a new webpage 116. For example, a new "confirm your order" webpage 116 may be displayed after a user 124 has finished editing a payment plan 134. The merchant site server 114 may provide an action handler for various dispositions such as, workflow in progress, workflow complete, error, or service failure. If a handler is defined for a disposition, the widget 112 can issue an HTTP POST to the handler.

Static widgets 112 can be configured to GET a resource on the merchant site server 114 or POST to a resource. Because a link's referent and a form's action may be determined when the widget 112 is constructed, the merchant site server 114 can specify the appropriate locations when the merchant site server 114 requests the widget 112. When a user 124 submits a form in a static widget 112, the contents of the form can be POSTed to the resource designated by the merchant site server 114, which is referred to herein as the continuation handler. A "continuation handler" can refer to the hosting service's URI for receiving a HTTP POST or GET from a static widget. The contents of the POST can include form fields filled in by the user 124, which may vary across different types of static widgets 112.

A continuation handler of a merchant site server 114 can receive a HTTP POST from the widget 112. The contents of the POST can be a form-encoded or multipart body, for example not JSON, so the merchant site server 114 may extract payments portal 102-specific values; the names of these form field values can share the same payments portal 102-reserved namespace or prefix to simplify extraction of these fields. The location of a static flow handler for the widget 112 can be given in a POST parameter. The field names and prefixes can be part of the client integration protocol for a payments portal 102.

The continuation handler can be configured to extract the URI of the static flow handler and assemble the payments portal 102 form field value into a JSON object to POST to the flow handler. The continuation handler can also make a request to the payments portal 102 and the response returned by the static flow handler can contain information present in an action disposition event published or posted by a dynamic widget 112. The merchant site server 114 can take other actions including requests to other payments portal 102 resources. The merchant site server 114 can assemble a webpage 116 for a response from the user 124 and return the webpage to the browser 120.

Links in static widgets 112 may be configured to reference a continuation handler of the merchant site server 114 and can include information to identify the link as well as the location of an appropriate static flow handler as query parameters. The continuation handler can extract the parameters and call the flow handler in a manner that may be similar to the manner in which the continuation handler handles a form submission.

In some embodiments of the concepts and technologies described herein, data used by widgets 112 may be transformed to HTML for display. This transforming of the widgets 112 can occur in a browser 120 for dynamic widgets 112 or on a server in the case of static widgets 112. According to some embodiments, templates can be used to express structure of the HTML and how data in the widgets is bound to various elements. The templates can be used to support various additional features described herein such as, for example, string and image localization and/or customization. Additional details of the templates are illustrated and described below with reference to FIGS. 12A-13C.

FIG. 1 illustrates one payments portal 102, one network 104, one merchant site server 114, one computing device 118, one instance of payments services 132, and one data store 142. It should be understood, however, that some implementations of the payment system 100 can include one or more payments portals 102, one or more than one network 104, zero, one, or more than one merchant site server 114, and zero, one, or more than one computing device 118, zero, one, or more than one instance of payments services 132, and zero, one, or more than one data store 142. As such, the illustrated embodiment of the payment system 100 should be understood as being illustrative, and should not be construed as being limiting in any way.

Figure 2:
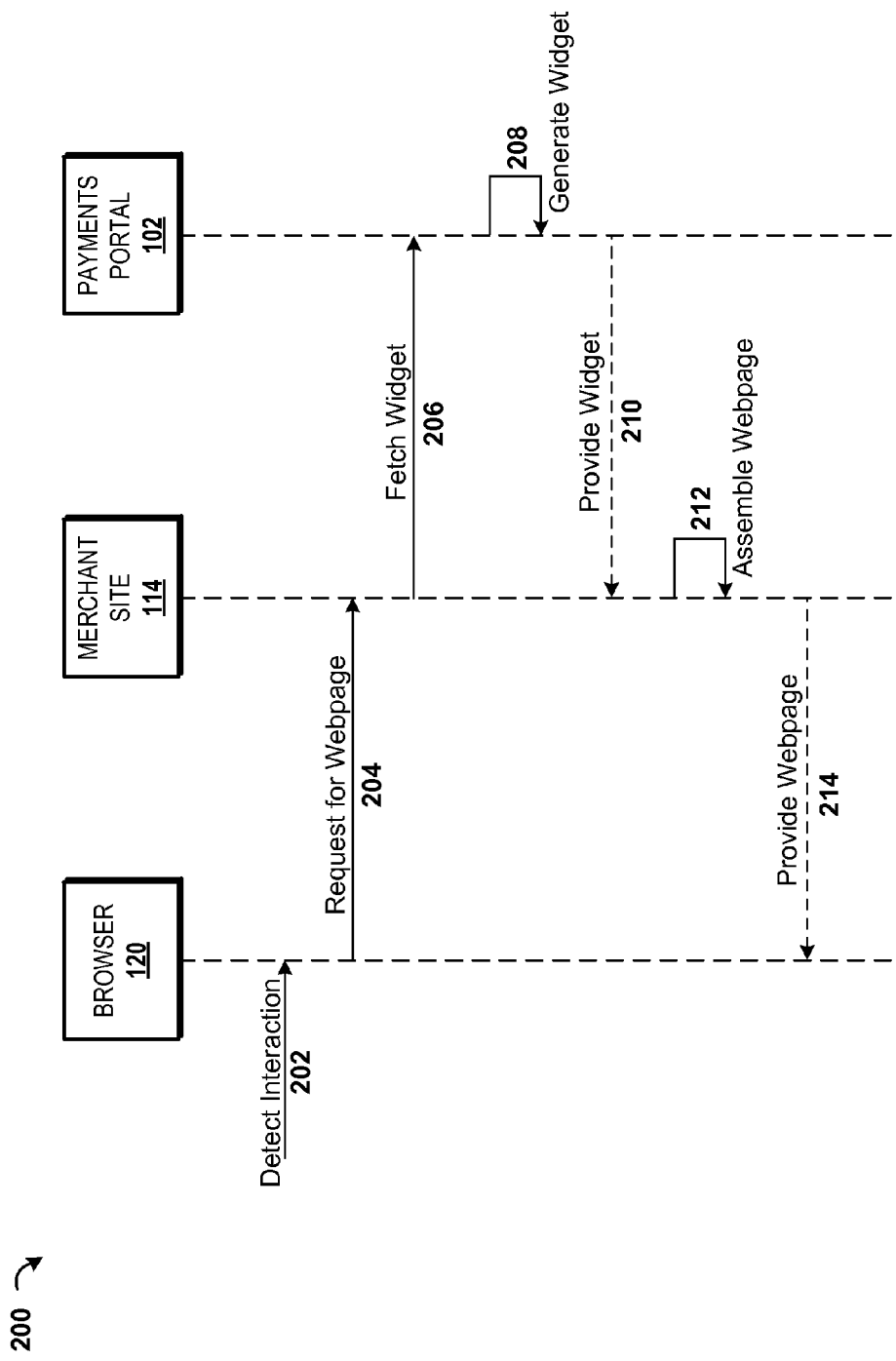
FIG. 2 is a ladder diagram showing aspects of a method for providing a webpage including a widget, according to an illustrative embodiment.

Turning now to FIG. 2, aspects of a method 200 for fetching or obtaining a widget will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted and/or performed simultaneously, without departing from the scope of the appended claims.

It also should be understood that the illustrated methods can be ended at any time and need not be performed in their respective entireties. Some or all operations of the methods disclosed herein, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic and any combination thereof.

For purposes of illustrating and describing the concepts of the present disclosure, the methods described herein are described as being performed by the payment system 100 via a browser 120 executing on a computing device 102, the merchant site server 114, the payments portal 102, and in some instances, webpages 116 and/or the payment services 132. It should be understood that this embodiment is illustrative, and should not be viewed as being limiting in any way. According to various contemplated implementations of the concepts and technologies disclosed herein, devices other than the payment system 100 can provide the functionality described herein via execution of one or more applications, modules, and/or services instead of, or in addition to, the browser 120, the merchant site server 114, the payments services 132, the webpage 116, and/or the payments portal 102.

It should be noted that for simplicity, routing (e.g., via the routing services 130) is not illustrated in FIG. 2, though the routing describe above with reference to FIG. 1 can be included in the method 200. The method 200 begins at operation 202, where the browser 120 detects an interaction with one or more widgets 112 included in and/or referenced by a webpage 116. The interaction detected in operation 202 can include, for example, a click on the widget 112 for various purposes. In the case of the example of payment widgets 112, the interaction detected at operation 202 can include, for example, a click, tap, or other input with respect to a payment option, a request for payment information, a request for payment method information, a request to manage a payment option or preferences associated with a payment account, other payment related operations, or the like. Because the widgets 112 are not limited to payments widgets, the interaction detected in operation 202 may be any interaction with one or more widgets 112 of various types.

From operation 202, the method 200 proceeds to operation 204. At operation 204, the browser 120 can generate a request for a webpage 116 from the merchant site server 114. The request generated in operation 204 can include an HTTP request such as a GET command, an Ajax request, and/or other types of requests for fetching or obtaining the webpage 116. The request detected in operation 204 need not be an explicit request for a webpage 116. Rather, the request detected in operation 204 may include a click, touch, and/or other input for data linked to and/or associated with the widget 112 and/or the webpage 116. As such, it should be understood that the request detected in operation 204 can include detecting various user actions at the computing device 102.

From operation 204, the method 200 proceeds to operation 206. At operation 206, the merchant site server 114 can generate a request to fetch a widget 112 for including, embedding and/or referencing in the webpage 116. The request generated by the merchant site server 114 in operation 206 can correspond to a fetch command for requesting the widget 112 from the payments portal 102. The fetch command can be submitted with other data, for example, data indicating state information, pipeline or workflow progress, versioning information, combinations thereof, or the like. Furthermore, the fetch command can be submitted to the payments portal 102 via the routing services 130, as discussed above.

From operation 206, the method 200 proceeds to operation 208. At operation 208, the payments portal 102 can generate the widget 112 requested in operation 206. As explained above, the widget generation module 106 of the payments portal 102 can generate the widget 112, if desired. According to various embodiments, the payments portal 102 can generate the widget 112 based upon the interaction detected in operation 202. Thus, if the interaction detected at operation 202 corresponds to a request to begin a payment process, for example, the widget 112 generated in operation 208 can correspond to an option to enter a shipping address, select a payment method, select a payment plan, or the like. If the interaction detected at operation 202 corresponds to a request to edit a payment method, for example, then generating the widget 112 in operation 208 can correspond to generating a widget 112 for presenting a payment method and allowing editing of the payment method. Although not shown in FIG. 2, the payments portal 102 can fetch data from the payments systems 132 and/or other devices or services. Because various widgets 112 are contemplated and described herein, it should be understood that this embodiment is illustrative, and should not be construed as being limiting in any way.

From operation 208, the method 200 proceeds to operation 210. In operation 210, the payments portal 102 can provide the widget 112 to the merchant site server 114. Similarly, operation 210 can correspond to the merchant site server 114 obtaining the widget 112 from the payments portal 102. From operation 210, the method 200 can proceed to operation 212. In operation 212, the merchant site server 114 can assemble the webpage 116 by embedding and/or referencing the widget 112 obtained in operation 212. Because the widget 112 can be embedded as a reference, the merchant site server 114 can update the webpage 116 to include a reference to the widget 112 and/or can modify code and/or scripts in the webpage 116 to include code and/or scripts in the widget 112. Because the widget 112 can be incorporated into the webpage 116 in additional and/or alternative ways, it should be understood that this embodiment is illustrative, and should not be construed as being limiting in any way.

From operation 212, the method 200 proceeds to operation 214. In operation 214, the merchant site server 114 provides the webpage 116 to the browser 120. It should be understood that the merchant site server 114 can provide the webpage 116 to the computing device 118, and the browser 120 can render the webpage 116. Thus, operation 214 can also correspond to the browser 120 obtaining the widget 112. The method 200 can terminate after operation 214, in some embodiments.

Figure 3:
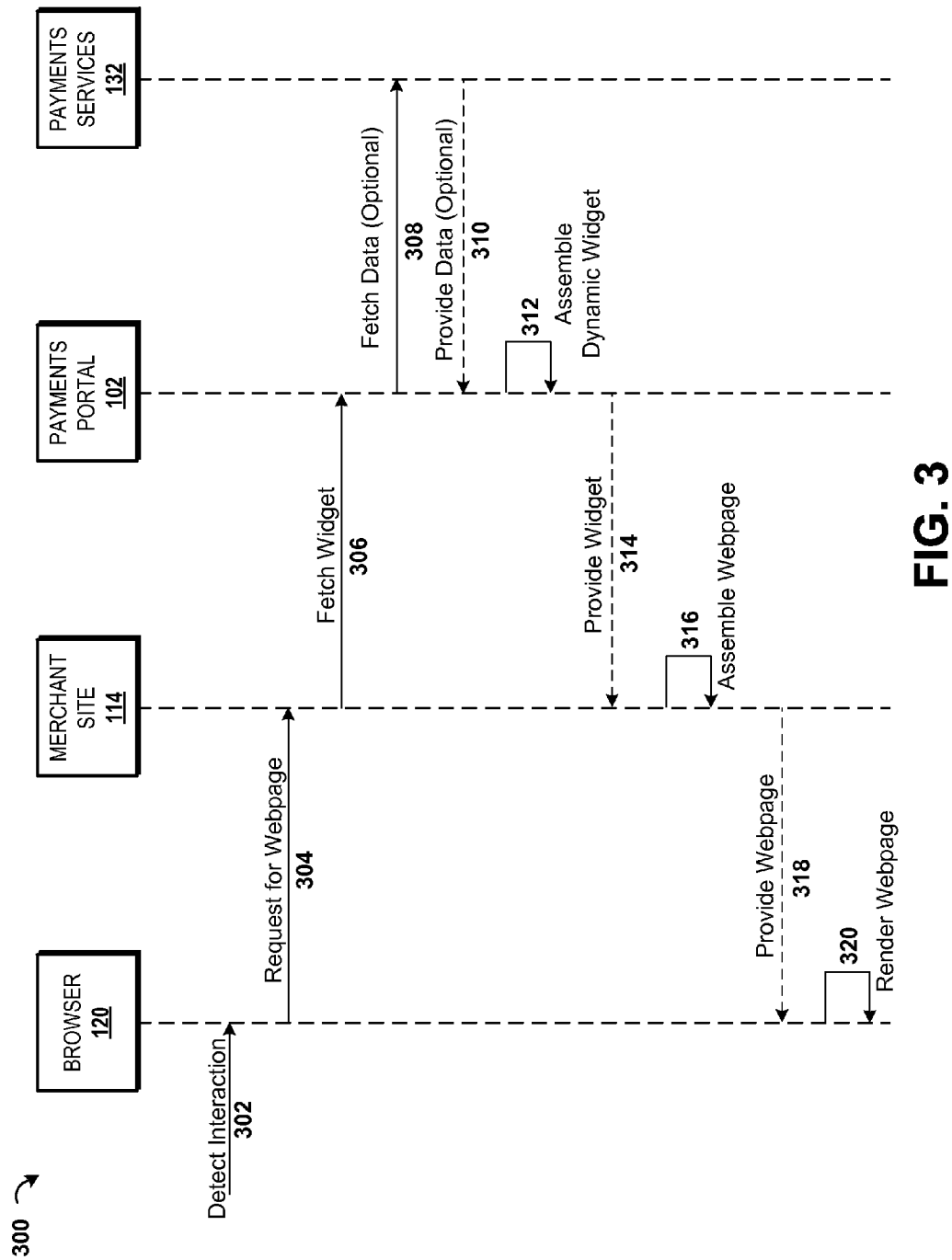
FIG. 3 is a ladder diagram showing aspects of a method for providing a webpage including a dynamic widget, according to one illustrative embodiment.

Turning now to FIG. 3, aspects of a method for interacting with a widget 112 will be described in detail. In particular, FIG. 3 shows an interaction with a dynamic widget 112 that displays information for a customer. The method 300 begins at operation 302, where the browser 120 detects an interaction with one or more widgets 112 included in and/or referenced by a webpage 116. It should be appreciated that detecting the interaction at operation 302 can be, but is not necessarily, similar or even identical to detecting the interaction at operation 202.

From operation 302, the method 300 proceeds to operation 304. At operation 304, the browser 120 can generate a request for a webpage 116 from the merchant site server 114. It can be appreciated that generating the request at operation 304 can be, but is not necessarily, similar or even identical to generating the request at operation 204.

From operation 304, the method 300 proceeds to operation 306. At operation 306, the merchant site server 114 can generate a request to fetch a widget 112 for including in the webpage 116 and/or for referencing in the webpage 116. It should be understood that generating the request to fetch the widget 112 in operation 306 can be similar, or even identical to generating the request to fetch the widget 112 in operation 206.

From operation 306, the method 300 can proceed to operation 308. In some embodiments, operations 308-310 can be omitted and/or performed after the webpage 116 is rendered by the browser 120 as explained below. Thus, operation 308-310 can correspond to an optional data preload operation that can reduce latency of the widgets 112, and can be omitted in various embodiments. In operation 308, the payments portal 102 can generate a request for data from the payments services 132. Thus, for example, the payments portal 102 can generate a request for data to be used in the widget 112 such as payment plans 134, payment methods 136, payment instruments 138, preferences 140, or the like. The data also can include, for example, promotions information, addresses, ordering history, preferred and/or default checkout options, shipping estimates and/or other information, combinations thereof, or the like. The data requested in operation 308 can be used to populate, for example, a list of payment methods, a list of payment plans, one or more preferences, combinations thereof, or the like, in the webpage 116 and/or the widget 112.

From operation 308, the method 300 can proceed to operation 310. In operation 310, the payments services 132 can provide the data requested in operation 308 to the payments portal 102. Similarly, in operation 310, the payments portal 102 can obtain the data requested by the payments portal 102 in operation 308. From operation 310, the method 300 proceeds to operation 312. Also, the method 300 can proceed to operation 312 from operation 306, if operations 308-310 are omitted as explained above. In operation 312, the payments portal 102 can generate the widget 112 requested in operation 306 using the data fetched in operation 308 and/or obtained or received in operation 310.

From operation 312, the method 300 can proceed to operation 314. In operation 314, the payments portal 102 can provide the assembled widget 112 to the merchant site server 114. It can be appreciated that the assembled widget 112 provided to and/or obtained by the merchant site server 114 in operation 314 can include HTML, JavaScript, data such as the payment data 144, other data, combinations thereof, or the like. From operation 314, the method 300 proceeds to operation 316. In operation 316, the merchant site server 114 can assemble a webpage 116 that includes the widget 112 obtained in operation 314. The widget 112 obtained in operation 314 can be embedded in the webpage 116. From operation 316, the method 300 proceeds to operation 318. In operation 318, the merchant site server 114 can provide the webpage 116 and the embedded and/or referenced widget 112 to the browser 120. From operation 318, the method 300 can proceed to operation 320. In operation 320, the browser 120 can render the webpage 116 and/or the widget 112 obtained in operation 318. After operation 320, the method 300 can terminate, in some embodiments.

Figure 4:
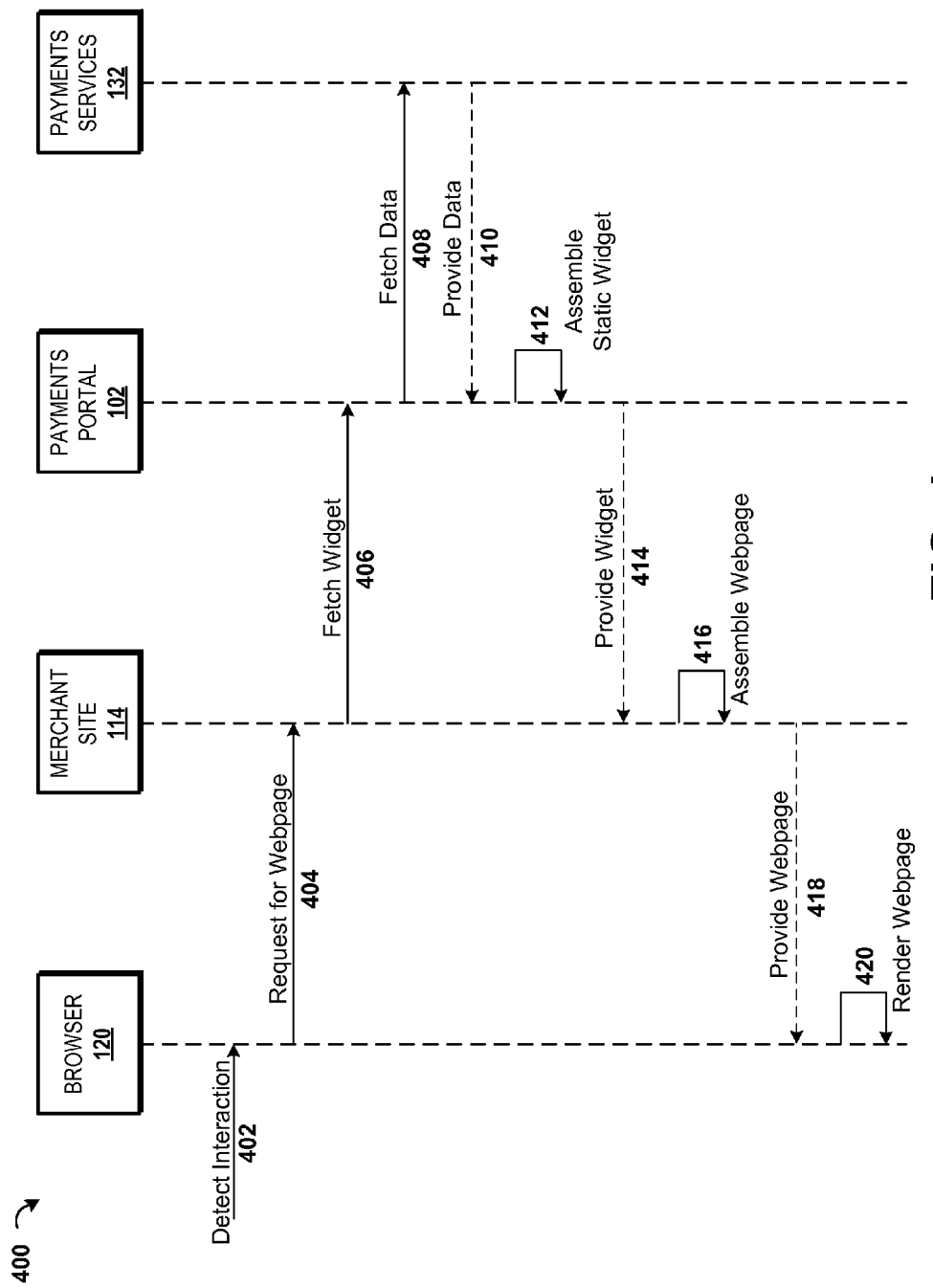
FIG. 4 is a ladder diagram showing aspects of a method for providing a webpage including a static widget, according to one illustrative embodiment.

Turning now to FIG. 4, aspects of a method for interacting with a widget 112 will be described in detail. In particular, FIG. 4 shows an interaction with a static widget 112 that displays information for a customer. The method 400 begins at operation 402, where the browser 120 detects an interaction with one or more widgets 112 included in and/or referenced by a webpage 116. From operation 402, the method 400 proceeds to operation 404. At operation 404, the browser 120 can generate a request for a webpage 116 from the merchant site server 114.

From operation 404, the method 400 proceeds to operation 406. At operation 406, the merchant site server 114 can generate a request to fetch a widget 112 for including in the webpage 116 and/or for referencing in the webpage 116. From operation 406, the method 400 proceeds to operation 408. In operation 408, the payments portal 102 can generate a request for data from the payments services 132. From operation 408, the method 400 proceeds to operation 410. In operation 410, the payments services 144 can provide the data requested in operation 408 to the payments portal 102. Similarly, in operation 410, the payments portal 102 can obtain the data requested by the payments portal 102 in operation 408.

From operation 410, the method 400 proceeds to operation 412. In operation 412, the payments portal 102 can assemble the widget 112 requested in operation 406 using the data fetched in operation 408 and/or obtained or received in operation 410. In FIG. 4, the widget 112 is assumed to be a static widget 112. As explained above, a static widget 112 can be used on a non-JavaScript enabled client such as some mobile phones, some media viewers and/or e-reader devices, some computers, combinations thereof, or the like. As such, the widget 112 assembled in operation 412 can include HTML code for providing the functionality associated with the widget 112. As noted above, static widgets 112 may include some JavaScript, though according to various embodiments, the JavaScript included in static widgets 112 may not touch core functionality of the widgets 112 and instead may be provide to enhance the user experience ("UX") in various manners. It should be understood that this embodiment is illustrative, and should not be construed as being limiting in any way.

From operation 412, the method 400 can proceed to operation 414. In operation 414, the payments portal 102 can provide the assembled widget 112 to the merchant site server 114. It can be appreciated that the assembled widget 112 provided to and/or obtained by the merchant site in operation 414 can include HTML, as explained above. From operation 414, the method 400 proceeds to operation 416. In operation 416, the merchant site server 114 can assemble a webpage 116 that includes the widget 112 obtained in operation 414. From operation 416, the method 400 proceeds to operation 418. In operation 418, the merchant site server 114 can provide the webpage 116 and the embedded and/or referenced widget 112 to the browser 120. From operation 418, the method 400 can proceed to operation 420. In operation 420, the browser 120 can render the webpage 116 and/or the widget 112 obtained in operation 418. After operation 420, the method 400 can terminate, in some embodiments.

Figure 5:
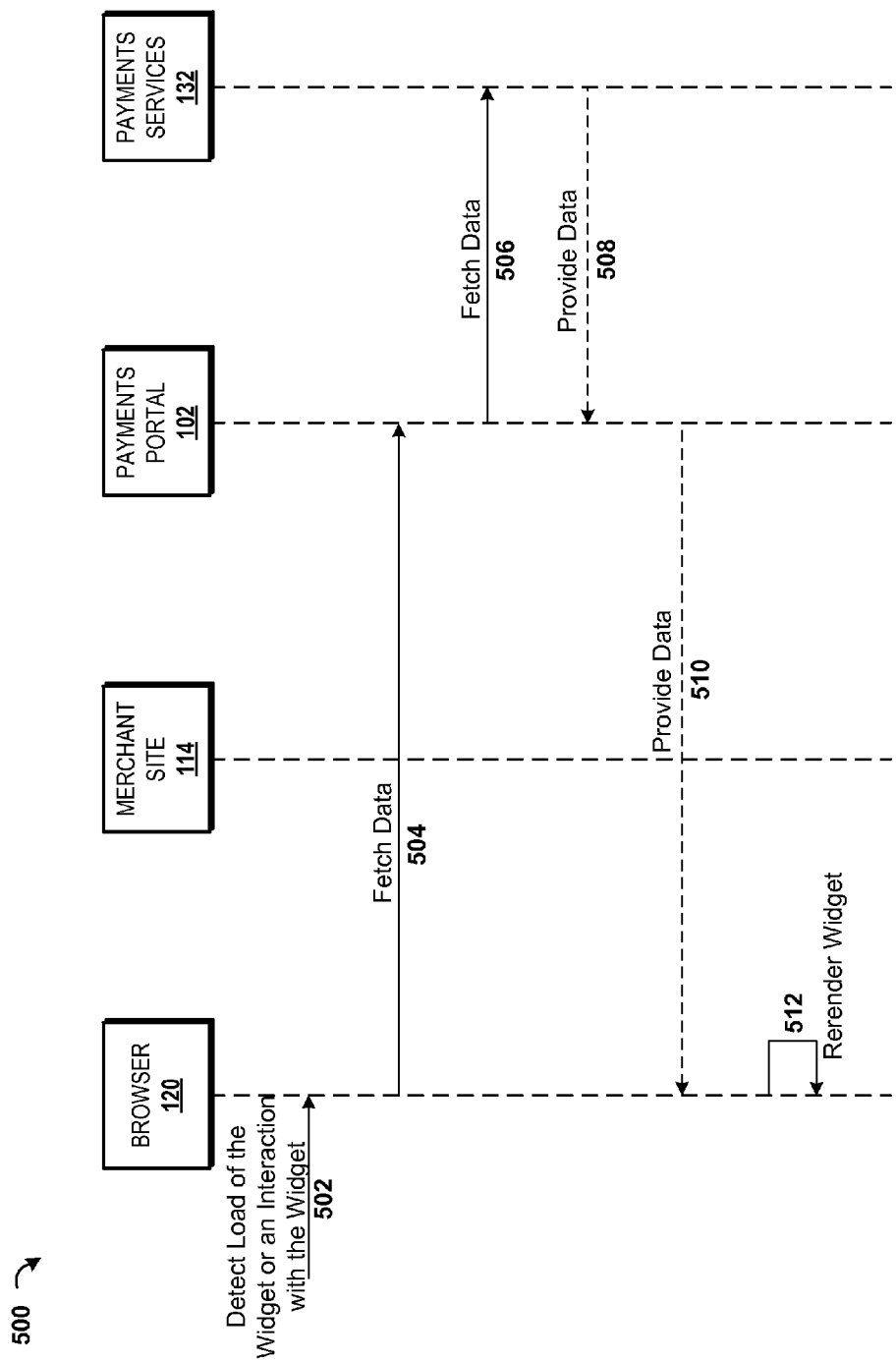
FIG. 5 is a ladder diagram showing aspects of a method for interacting with a dynamic widget, according to one illustrative embodiment.

Turning now to FIG. 5, aspects of a method for interacting with a widget 112 will be described in detail. In particular, FIG. 5 shows an interaction with a dynamic widget 112 that displays information for a customer. The method 500 begins at operation 502, where the browser 120 detects an interaction with one or more widgets 112 included in and/or referenced by a webpage 116. In some embodiments, operation 502 can correspond to loading of a widget 112 instead of, or in addition to, an interaction with the widget 112. Thus, it can be appreciated that the widgets 112 described herein can be configured to fetch data upon loading of the widgets 112 and/or a webpage 116 containing or including the widgets 112. From operation 502, the method 500 proceeds to operation 504. At operation 504, the browser 120 can generate a request for data. As shown in FIG. 1, the browser 120 can be configured to send the request 126 for the data to the payments portal 102 without interacting with the merchant site server 114. As such, it can be appreciated that the merchant site server 114 may not participate in the method 500. It should be appreciated from the description of FIG. 1 that the payments portal 102 can use routing services 130 to route the request 126 to the payments portal 102 using a proxy or other routing functionality. For simplicity, the routing of requests is not explicitly shown in FIG. 5.

From operation 504, the method 500 proceeds to operation 506. At operation 506, the payments portal 102 can forward the data request generated in operation 504 to the payments services 132. From operation 506, the method 500 proceeds to operation 508. At operation 508, the payments portal 102 can obtain the data requested in operation 506. As explained above in detail, the data requested in operations 504-506 can correspond to any type of payments data such as, for example, data indicating payment plans, payment methods, billing addresses, preferences, other data, combinations thereof, or the like.

From operation 508, the method 500 can proceed to operation 510. At operation 510, the payments portal 102 can provide the data fetched in operation 506 and obtained in 508 to the browser 120. Again, it can be appreciated that the data provided in operation 510 can be provided to the browser 120 without involvement from the merchant site server 114. As such, it can be appreciated that the data provided to the browser 120 in operation 510 can correspond to one or more of the updates 128 illustrated in FIG. 1. It should be understood that this embodiment is illustrative, and should not be construed as being limiting in any way.

From operation 510, the method 500 proceeds to operation 512. At operation 512, the browser 120 can re-render the widget 112. In some embodiments, the widget 112 can be re-rendered using the data received in operation 510, though this is not necessarily the case. As noted above, the data received in operation 510 can correspond to one or more of the updates 128, and as such, operation 512 can correspond to rendering an update at the browser 120 in addition to, or instead of, re-rendering the widget 112. After operation 512, the method 500 can terminate, in some embodiments.

Figure 6:
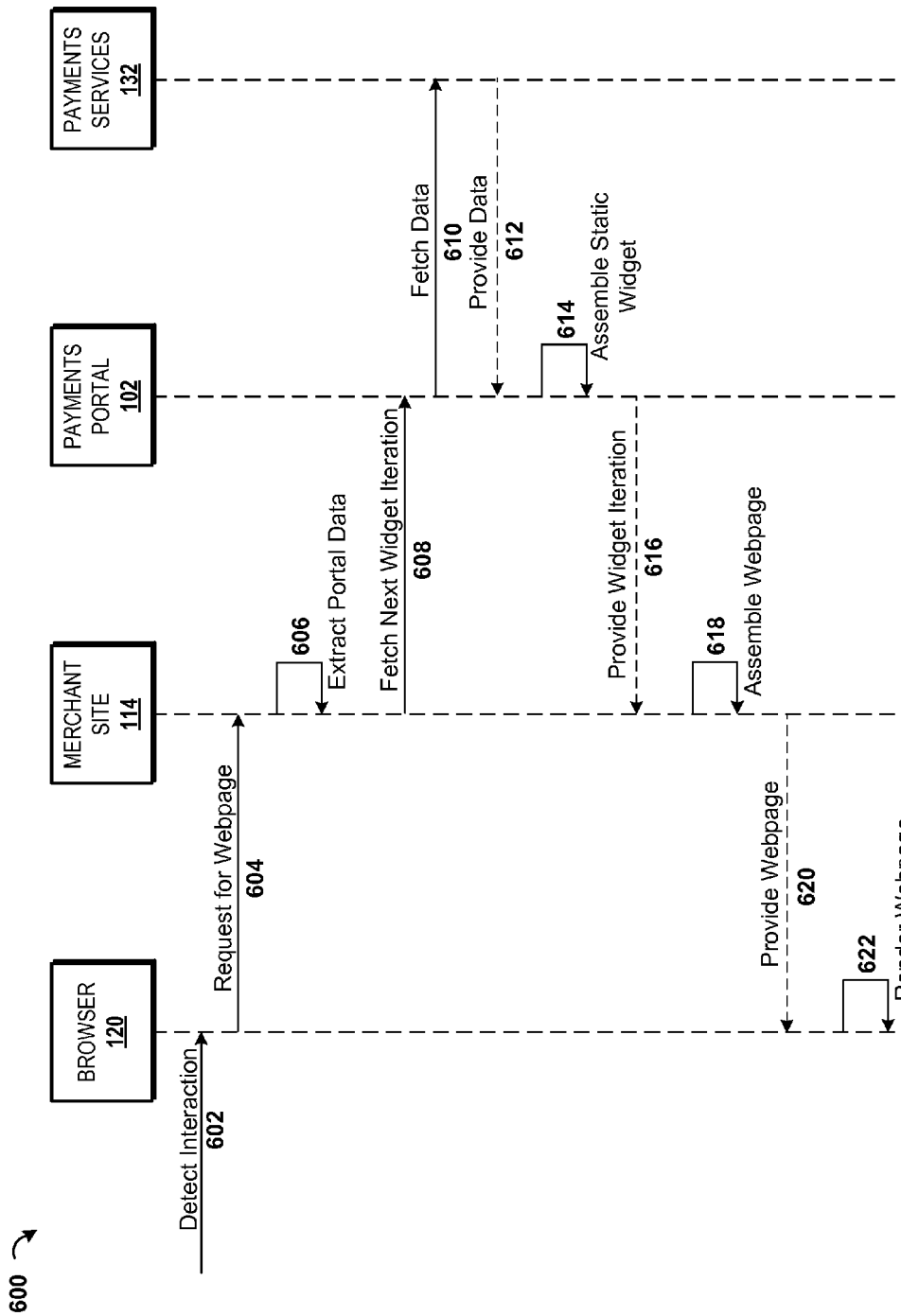
FIG. 6 is a ladder diagram showing aspects of a method for interacting with a static widget, according to one illustrative embodiment.

Turning now to FIG. 6, aspects of a method for interacting with a widget 112 will be described in detail. In particular, FIG. 6 shows an interaction with a static widget. The method 600 begins at operation 602, where the browser 120 detects an interaction with one or more widgets 112 included in and/or referenced by a webpage 116. In the illustrated method 600, the interaction detected at operation 602 can correspond to a request for a webpage 116 that contains a widget 112 as explained above. Because the method 600 illustrates an update for a static widget 112, it should be understood that interactions with the widget 112 can result in changes being made to the webpage 116 containing the widget 112.

From operation 602, the method 600 proceeds to operation 604. At operation 604, the browser 120 can generate a request for an updated webpage 116. As shown in FIG. 1, the browser 120 can be configured to send the request 126 for the updated webpage to the merchant site server 114. From operation 604, the method 600 proceeds to operation 606. At operation 606, the payments portal 102 can extract, from the request for the updated webpage, data for identifying a version of the widget 112, a type of widget 112, and/or a next iteration of the widget 112 to be requested by the merchant site server 114. The payments portal 102 also can extract, for example, a pipeline or workflow progress.

From operation 606, the method 600 proceeds to operation 608. At operation 608, the merchant site server 114 can request the next iteration of the widget 112 from the payments portal 102. Thus, for example, if the widget 112 interacted with at operation 602 corresponds to a widget 112 for presenting multiple payment plans, the next iteration of the widget 112 can include a widget 112 for applying the selected payment plan to the balance owed. It should be understood that this embodiment is illustrative, and should not be construed as being limiting in any way.

From operation 608, the method 600 can proceed to operation 610. In operation 610, the payments portal 102 can request data to be used in the next iteration of the widget 112 from the payment services 132. From operation 610, the method 600 can proceed to operation 612. At operation 612, the payments service 132 can provide the data requested in operation 610 to the payments portal 102. Thus, the payments portal 102 can obtain the data for the next iteration of the widget 112 from the payments services 132 for generating the next iteration of the widget 112.

From operation 612, the method 600 proceeds to operation 614. At operation 614, the payments portal 102 can assemble the static widget 112 that corresponds to the next iteration of the widget 112 interacted with at operation 602. From operation 614, the method 600 can proceed to operation 616. At operation 616, the payments portal 102 can provide the next iteration of the widget 112. Because the widget assembled in operation 614 can correspond to a static widget, the updated widget 112 can correspond to HTML code or other non-JavaScript code. As noted above, the static widgets also can include JavaScript, though the JavaScript, if included, may not be included to provide any payment functionality.

From operation 616, the method 600 can proceed to operation 618. At operation 618, the merchant site server 114 can assemble the webpage 116. Operation 618 can include the merchant site server 114 assembling the webpage 116 by embedding and/or referencing the widget 112 assembled in operation 618. From operation 618, the method 600 proceeds to operation 620. In operation 620, the merchant site server 114 can provide the assembled webpage 116 to the browser 120.

From operation 620, the method 600 can proceed to operation 622. At operation 622, the browser 120 can render the data webpage 116 received in operation 622. As noted above, the data received in operation 610 can correspond to one or more of the updates 128, and as such, operation 622 can correspond to rendering an updated webpage 116 at the browser 120.

Figure 7:
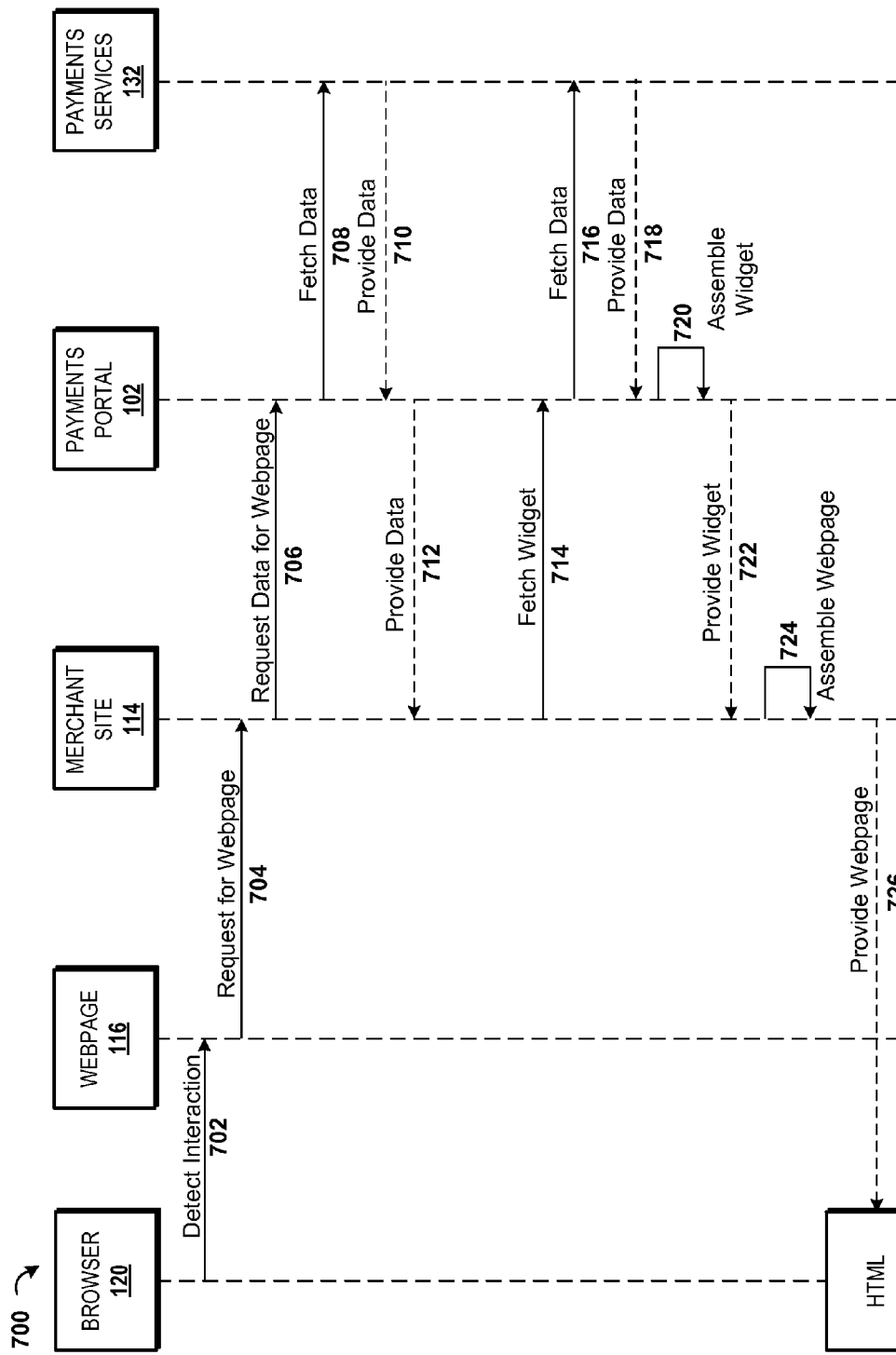
FIGS. 7-9 are ladder diagrams showing aspects of methods for interacting with widgets, according to some illustrative embodiments.
Figure 8:
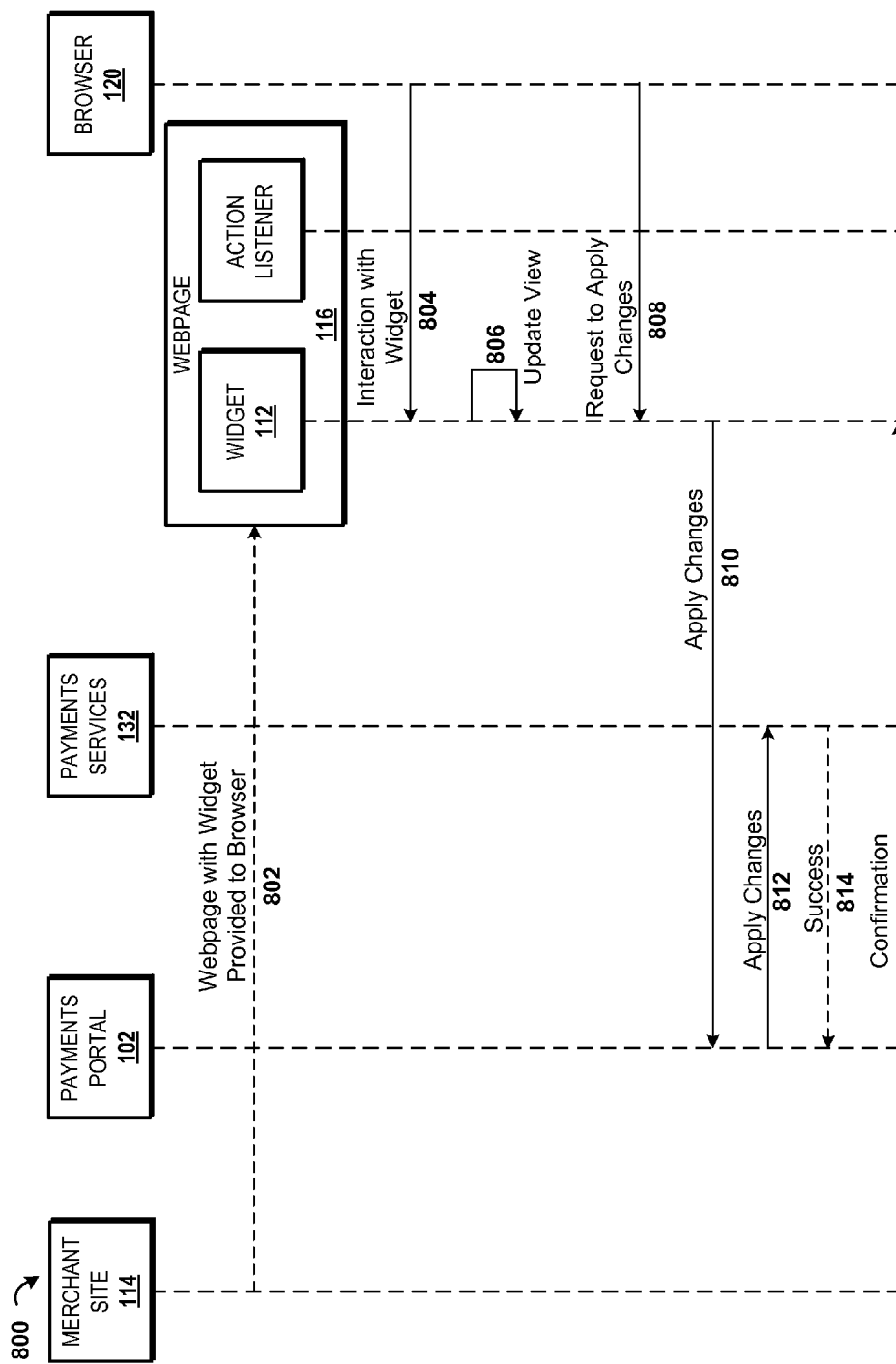
Figure 9:
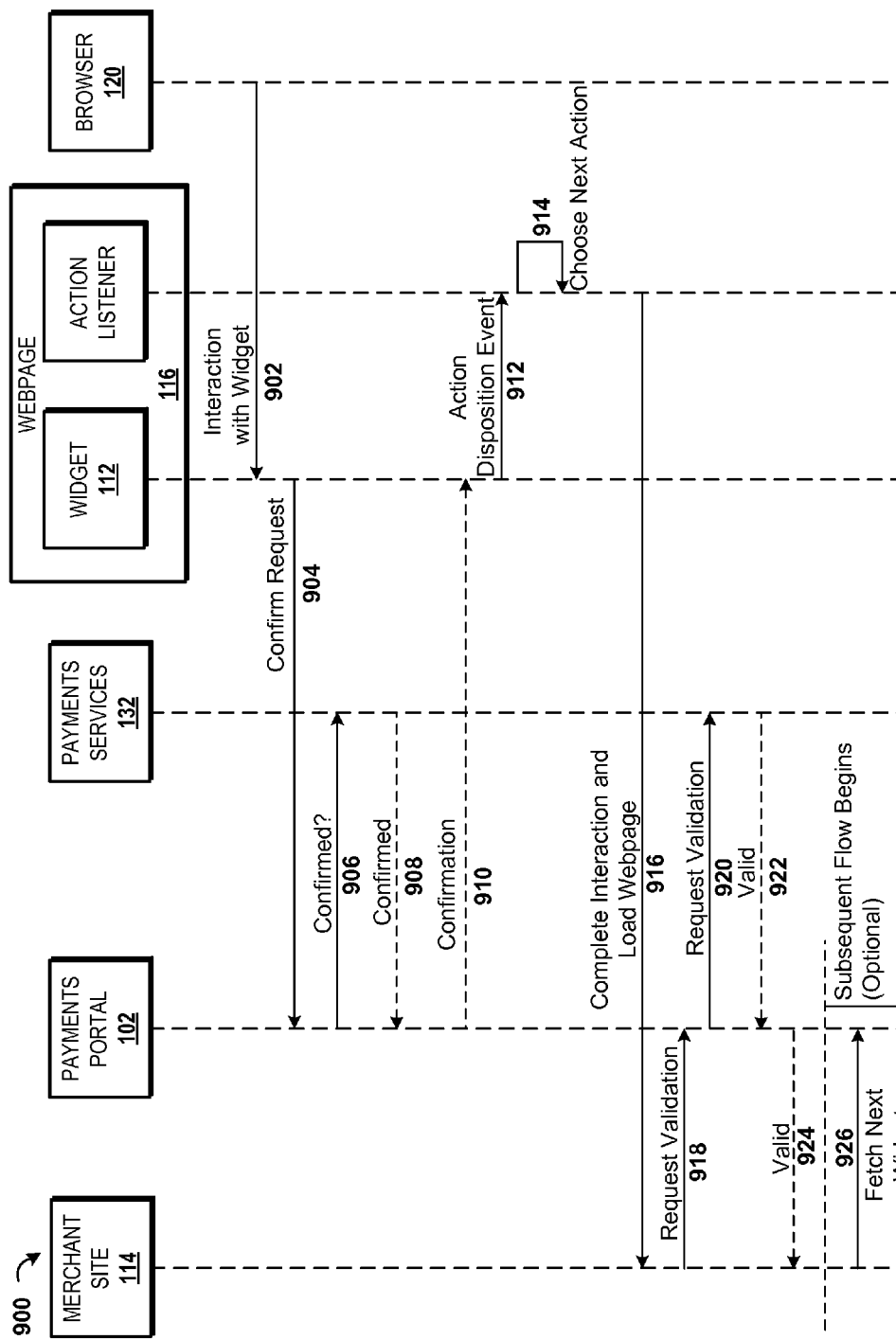

Turning now to FIGS. 7-9, additional aspects of widget interactions will be described, according to some embodiments. Some additional aspects of the concepts and technologies described herein will be described with reference to an example of a widget interaction. In the below example illustrated in FIGS. 7-9, illustrated entities include a browser 120, which can be associated with an end user or computing device 118 accessing a merchant site server 114 or other webpage 116 incorporating the widgets 112; a hosting service such as the merchant site server 114, which can include a service generating site-specific content and embedding widgets 112; the payments portal 102, which can include services for serving and/or handling API calls from the browser 120 and the merchant site server 114; payments services 132, for example internal payments services that can be called by the payments portal 102 to manipulate resources used by the payments portal 102 such as, for example, payment plans 134, payments method 136, or the like; and a payment selection page, which can include a webpage 116 owned and/or associated with the merchant site server 114. The webpage 116 can contain a widget 112 for editing a payment plan 134 or other aspects of payment services 132.

In FIGS. 7-9, the widget 112 can correspond to HTML and JavaScript owned by the payments portal 102. The widget 112 can be used to provide a UI to edit and confirm a payment selection or other aspect of payments. FIGS. 7-9 also show one or more action listeners, which can include hosting service-provided JavaScript in a payment selection page that can be configured to listen for action disposition events; and one or more action disposition events, which can correspond to notifications from the widget 112 to the embedding webpage 116 for indicating that a customer interaction with the widget 112 and/or the containing webpage 116 has occurred. As explained above, it should be noted that calls to the payments portal 102 can be routed through the routing services 130 or other routing or proxy services, though this is not shown in FIGS. 7-9 for simplicity.

Turning first to FIG. 7, a first example interaction with the widget 112 is shown. In particular, a customer may interact with the widget 112 as shown at operation 702, and the interaction may be detected by the webpage 116. The interaction can include, for example, the customer selecting a "Proceed to Checkout" option or button from a shopping cart page or other webpage 116, thereby launching a checkout pipeline. Of course, the interaction detected in operation 702 can correspond to other types of interactions as described herein. From operation 702, the method 700 proceeds to operation 704. At operation 704, the webpage 116 can trigger a request for the requested webpage 116. In this example, the webpage 116 can trigger a request to fetch the checkout page requested in operation 702.

From operation 704, the method 700 can proceed to operation 706. At operation 706, the merchant site server 114 can call the payments portal 102 to obtain payment options associated with the order based upon the order context. The order context can include, for example, a number of items, item identifiers, shipping address, shipping options, other information, or the like. From operation 706, the method 700 can proceed to operation 708. At operation 708, the payments portal 102 can call one or more of the payments services 132 or other backend services to obtain payment options such as, for example, a default plan, payment instrument lists, payment methods, or the like. From operation 708, the method 700 can proceed to operation 710. In operation 710, the called payments services 132 can return the requested payment options. The payment options can be provided, for example, as a uniform resource indicator ("URI") for the payment plan that encapsulates the payment plan, or other information. The payment options can be returned, via the payments portal 102, to the merchant site server 114, as shown at operation 712.

From operation 712, the method 700 can proceed to operation 714. At operation 714, the merchant site server 114 can request a widget 112 for providing or editing the payment options obtained in operation 712. The payments portal 102 can fetch data to be included in the widget 112 from the payment services 132, as shown at operation 716, and the data can be obtained by the payments portal 102 as shown at operation 718. From operation 718, the method 700 can proceed to operation 720, where the payments portal 102 can assemble the widget 112 from the data obtained in operation 718, and the payments portal 102 can provide the widget 112 to the merchant site server 114 as shown at operation 722.

From operation 722, the method 700 can proceed to operation 724. At operation 724, the merchant site server 114 can assemble the webpage 116 including the widget 112 obtained in operation 722, and provide the webpage 116 to the browser 120 as shown at operation 726. It can be appreciated that the webpage 116 can be provided to the customer via the browser 120, though this is not shown in FIG. 7.

Turning now to FIG. 8, aspects of a method 800 for an interaction with a widget 112 will be described in detail. In FIG. 8, some objects that can be included in and/or provided with the widgets 112 are shown and will be explained in additional detail. In some embodiments of the concepts and technologies disclosed herein, objects that a webpage 116 can provide to a dynamic widget 112 can include, but are not limited to, action listeners, state change listeners, and action handlers. The action listeners and state change listeners can include JavaScript event handlers that may be called when an event of an appropriate type occurs.

The action handlers can include resources on the merchant site server 114. A state change listener can be notified when the state of a resource underlying the widget 112 changes. If the webpage 116 includes content outside of the widget 112 that may be affected by changes to the state of a resource of the payments portal 102, the action listener can initiate an action to update that content. A state change made in a widget 112 may not have an effect until it has been applied to the resources accessed through a payments portal 102. For example, the user 124 may change a selected payment instrument in a widget 112 and may apply the change by submitting the update to the payment services 132 and/or the payments portal 102.

The widget 112 can notify the state change listener that a state change occurred. For this reason, the state change listener can be notified if resources of the payments portal 102 are changed. The state change listener can re-fetch that resource via an Ajax call to the payments portal 102 directly or by requesting one of its own resources, which can query the payments portal 102. The state change listener also can pass control to the merchant site server 114 for a refresh of the full webpage 116. In such a case, the state change listener can request state information from the widget 112 so that the state information can be preserved on the next page.

The method 800 can begin with operation 802. At operation 802, the merchant site server 114 or other entity can provide the webpage 116 containing the widget 112 to the browser 120. The webpage 116 also can include an action listener, which can be configured to detect an interaction with the webpage 116 by the customer and/or other entities via the browser 120.

From operation 802, the method 800 proceeds to operation 804. At operation 804, the customer or other entity interacts with the widget 112 included in the webpage 116. In response to detecting the interaction with the widget 112, the widget 112 can trigger an update view action to update the widget 112, as shown at operation 806. From operation 806, the method 800 proceeds to operation 808, where the customer may request that changes made to the widget 112 be applied. Thus, for example, if the customer selects a payment instrument such as a particular credit card, or the like, the customer may request, in operation 808, that the selected payment instrument be used for the transaction.

From operation 808, the method 800 proceeds to operation 810. At operation 810, the widget 112 can apply the changes. The request to apply changes can be routed to the payments portal 102, and the payments portal 102 can apply the changes via communications with the payments services 132 as shown at operation 812. The payments services 132 can confirm successful updating of the payment data 144 at operation 814, and the payments portal 102 can report the confirmation to the widget 112 at operation 816. In response to detecting the confirmation reported at operation 816, the widget 112 can generate a state change event, though this is not explicitly shown in FIG. 8 for the sake of simplicity. It should be understood that this example is illustrative, and should not be construed as being limiting in any way.

Turning now to FIG. 9, aspects of another method 900 for interacting with the widget 112 are described. The method 900 begins with operation 902, where an interaction with the widget 112 via the browser 120 is detected. The interaction is described herein with reference to FIG. 9 as a request to modify an aspect of the payment options, though other types of interactions are possible and are contemplated. As explained above, the interaction detected in operation 902 can include selection of a payment option, initiation of a checkout pipeline, or other actions. From operation 902, the method 900 can proceed to operation 904. At operation 904, the widget 112 may make a confirm request with the payments portal 102, the request for confirming that the update has been completed by the widget 112. In some embodiments, JavaScript included in the widget 112 can generate the confirm request via executing scripts for communication with the payments portal 102. It should be understood that this embodiment is illustrative, and should not be construed as being limiting in any way.

In operations 906-910, the payments portal 102 can request confirmation of the payment options from the payments services 132, the payment services 132 can confirm the payment options to the payments portal 102, and the payments portal 102 can report success to the widget 112. The widget 112, for example JavaScript included in the widget 112, can fire an action disposition event to the action listener, as shown at operation 912. The action disposition event can include the confirmation success and the payment options, for example a URI of the payment plan.

From operation 912, the method 900 can proceed to operation 914. At operation 914, the action listener can choose a next action. In the illustrated example, the next action can correspond to an action for generating a next page in the payment pipeline. For example, the next page may correspond to a confirmation page showing that the payment options have been updated. It should be understood that this embodiment is illustrative, and should not be construed as being limiting in any way.

From operation 914, the method 900 proceeds to operation 916. At operation 916, the action listener can request loading of the next page from the merchant site server 114. The next page can correspond, for example, to a confirmation page. From operation 916, the method 900 can proceed to operation 918. At operation 918, the merchant site server 114 can request validation of the last action. In operations 920-924, the merchant site server 114 can confirm, via the payment services 132, that the last action was valid. In some embodiments, the method 900 can terminate after operation 924. Thus, operation 924 can correspond, in some embodiments of 900, to the end of a particular flow. As shown in FIG. 9, a new flow can commence after operation 924, in some embodiments. Thus, the method 900 can flow, in some embodiments, to operation 926. In operation 926, the merchant site server 114 can obtain a next widget 112 from the payments portal 102. The next widget 112 can correspond to a next flow or operation. Thus, it can be appreciated, with reference to FIG. 9, that a flow may continue after a flow associated with a particular widget 112 has completed. It should be understood that these examples are illustrative, and should not be construed as being limiting in any way.

Figure 10:
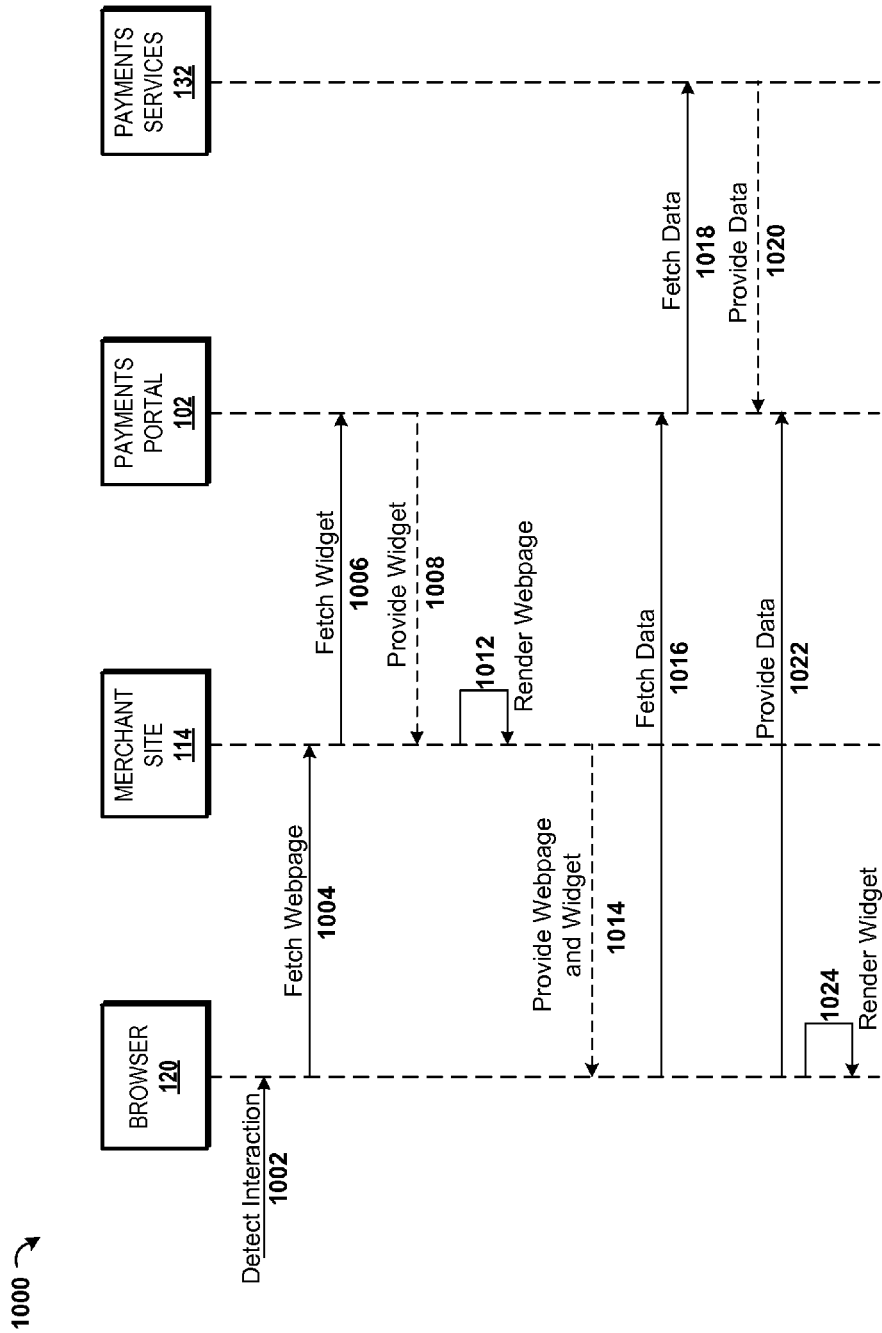
FIG. 10 is a ladder diagram showing aspects of a method for interacting with a widget, according to one illustrative embodiment.

FIG. 10 shows aspects of another method 1000 for interacting with a widget 112. Operations 1002-1012 may be similar to operations described above with reference to FIGS. 2-9 and therefore are not described again herein. From operation 1012, the method 1000 proceeds to operation 1014. In operation 1014, the browser 120 can request, from the payments portal 102, fetching of the payment options and/or other types of payment data 144. The request can be routed to the payments portal 102. From operation 1014, the method 1000 can proceed to operation 1016. At operation 1016, the payments portal 102 can request the data from the payments services 132, and obtain the data as shown at operation 1018.

The payments portal 102 can be configured to incorporate the HTML and JavaScript for the widget 112, which in some embodiments may not contain customer-specific code or data. In some embodiments, the widget 112 can include JavaScript for making an Ajax request or other request for data with which to populate itself once the widget 112 has been loaded. As shown at operation 1020, the payments portal 102 can provide the widget 112 to the browser as a JSON file or other type of data, and the browser 120 can render the widget 112 as shown at operation 1022.

Figure 11:
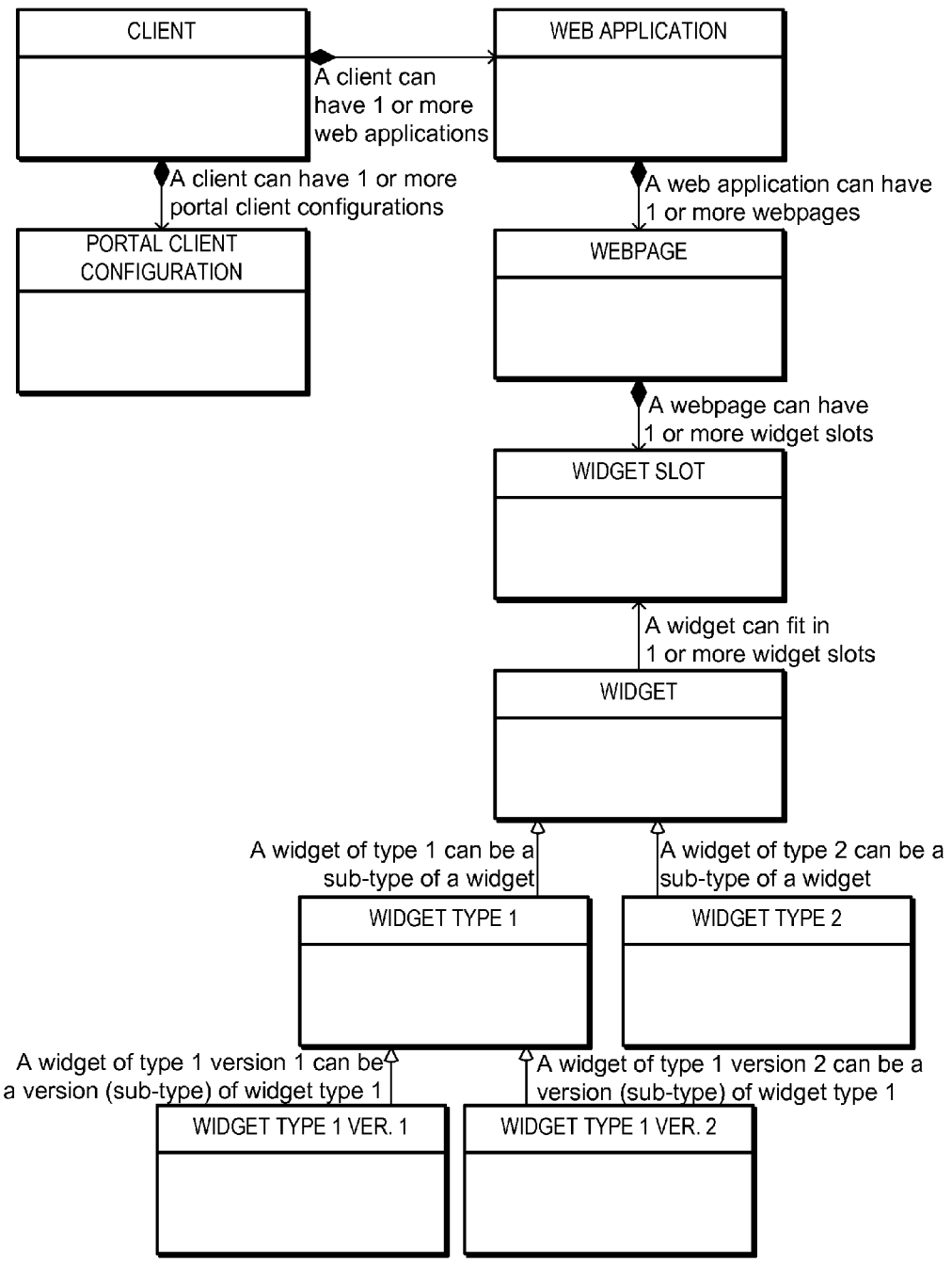
FIG. 11 is a UML diagram showing additional aspects of the payments portal disclosed herein, according to one illustrative embodiment.

FIG. 11 illustrates additional aspects of the payments portal 102 disclosed herein. In particular, FIG. 11 is a UML diagram showing some example relationships among the various aspects of the payments portal 102 disclosed herein, according to some embodiments. As shown in FIG. 11, various widgets 112 can be provided for various purposes. Furthermore, for a particular widget 112, one or more widget types may exist. Furthermore, for each widget type, multiple versions of the widgets 112 may exists. Thus, it can be appreciated that the concepts and technologies described herein support versioning of widgets 112. It should be understood that this embodiment is illustrative, and should not be construed as being limiting in any way. While the above description has referred to widgets 112 in the payments portal context, it should be understood that the concepts and technologies disclosed herein can be used to provide widgets for other contexts, if desired.

Turning now to FIGS. 12A-12B, aspects of image and string localization will be described in detail. The payments portal 102 can support text and image localization and customization. The payments portal 102 may return text and images that are to be translated or specialized for a particular locale and customized for a look and feel of a particular merchant site server 114. These text strings and images can include portions of the UI component itself as well as media that represent data outside of the internal payment systems.

With regard to localized text in UI components, the templates for each UI component can use string IDs to represent particular localizable text. Locale and widget context can be a part of the API 110 used by a hosting application to request a dynamic or static widget 112 by type. Thus, when serving a specific widget 112, the payments portal 102 can obtain and use the locale and merchant site server 114 information to localize strings that are part of the structure of the widget 112. In the case of dynamic widgets 112, the payments portal 102 can substitute the correct string values for the context and locale in the template. For string IDs referred to by ID in the JavaScript, the payments portal 102 also can make the localized version of each needed string ID available. To reduce latency of subsequent fetches of the same widget 112, the payments portal 102 can store localized/customized versions of widget templates.

Backend payment systems also can own potentially localizable string data. For example, the name of a credit card type (e.g., "BrandX," "BrandY," etc.) and the issuing banks for debit cards (e.g., "BankX," "CreditUnionY," etc.) can include data associated with a payment instrument 138 in a payment method service, and therefore may not be a part of the structure of a widget 112 in which this data appears.

A widget 112 running in a browser 120 may not look up string IDs, so the payments portal 102 may ensure that data returned by its APIs 110 be localized. A dynamic widget 112 can be preloaded with localizations of possible string IDs that may appear in the data. The payments portal 102 may use a map containing string IDs present in the data.

Some data may be consistent across multiple languages. For example, suppose that in response to a request, the payment method service can return the JSON shown in FIG. 12A. In this example, the text "brandX_card_78714" and "first_bank_of_townY_1478511" are string IDs. Given the locale fr_CA and the widget context, the payments portal 102 and/or the payment services 132 can analyze the strings map, fetching and inserting translations from the string translator. In certain embodiments, one or more of the payments portal 102 or the payment services 132 may perform the translations. The result may look like the example shown in FIG. 12B. As shown in FIG. 12B, the name 1200 "First Bank of TownY" has been translated into French. It should be understood that this embodiment is illustrative, and should not be construed as being limiting in any way.

The payments portal 102 also can be configured to provide localization for images for UI components. The payments portal 102 can return links to images that are part of the widget 112 as well as images that are part of other data such as, for example, data from various backing systems. Templates for the widgets 112 can use image IDs for images in the structure of the widget 112 and the image IDs can be expanded in the template prior to rendering and returning to the merchant site server 114. In some embodiments, the payment services 132 can be configured to resolve an image ID to an image tag for use in the widget 112.

In some embodiments, the widgets 112 can be designed with default images that do not require customization. Some clients may want controls and images inside a widget 112 to match the hosting webpage 116 or merchant site server 114. The payments portal 102 can enumerate images that the payments portal 102 uses as structural parts of a widget 112. This set of images can include various buttons, for example, "edit," "delete," "register," "deregister," or the like, and other structural image elements such as rounded corner images, gradient images, or the like. These enumerated images may be the only images used in the structure of the widgets 112.

The payments portal 102 also can support images for payments data. In addition to the images that make up the widget 112 structure, the payments portal 102 also may include images that are owned by the payments portal 102. Some of these images may be part of the data owned by other services, such as the credit card images, which can be returned as image IDs by the payment method service. Other images may not come directly from another service, but still may need to be controlled by the payments portal 102, such as an image containing promotional financing information. These images can be addressed by adding an images map to the data coming from the backing service, and can have the expansion to image tag occur in the payment services 132.

The payments portal 102 also can support CSS themes and/or skinning Widget 112 skinning can be handled by one or more complementary mechanisms. First, the payments portal 102 clients can provide configuration details for a pre-defined set of style attributes in the form of key-value pairs. For example:
{
    primary color: "#000000",
    secondary color: "#333333",
    font: "Helvetica, Arial, 'sans-serif'",
    table header: "blue"
}
These configuration details can be compiled on a per client basis before a unique CSS file is generated and delivered to the browser 120.

In another embodiment of client styling, common payments portal 102 elements can have consistent, documented CSS classes. The combination of these two methods can allow the merchant site servers 114 flexibility in that they can choose one or both for varying degrees of visual control over a look and feel of widgets 112. Merchant site servers 114 also can be given a choice of small, medium and large widgets 112, among other sizes. Each widget 112 size can have a clearly defined min-width and max-width, though the widget 112 can stretch or shrink to fit within specified constraints.

The payments portal 102 also can support declarative metadata for localization. Some marketplaces may support localization of text using a string ID and images using an image ID, as noted above. The payments portal 102 can use a process of resolving the string or image ID to the actually text in a particular language or the URL for an image. In server-side code, this can be done by making a call to fetch strings that are to be needed to render a page or widget 112 one time, and then looking up these strings later as needed. According to embodiments of the concepts and technologies described herein, the payments portal 102 may be configured to determine this information since the payments portal 102 can support pre-bundling of strings and may not be able to look the strings up at a later time. Similarly, the payments portal 102 can determine what strings are to be localized before launching in a particular locale, among other similar localization considerations.

To accomplish this, the payments portal 102 can support allowing a metadata block in templates. The metadata block can declare a set of string IDs and image IDs that are needed. When the widget 112 is bundled (e.g., the templates, code, and the like are packaged), the payments portal 102 can compute the strings that the widget 112 may need. It should be understood that this embodiment is illustrative, and should not be construed as being limiting in any way.

The payments portal 102 also can support JavaScript syntax analysis for duplication-free metadata. The declarative metadata approach can pose a challenge in that a list of strings needed may need to be listed separately from the metadata block. This means that strings may be listed, and not actually needed, or strings may not be listed and may be needed. This issue can be addressed by the payments portal 102 disclosed herein by completing an abstract syntax tree (AST) traversal to identify calls to functions that actually use a string ID. For some functions that take a string ID as their argument, the strings can be examined directly. For example, <% text("my_string_id"); %> can output the value of my_string_id.

Thus, the AST traversal can be used to search the code for calls to this function and to collect the strings this function is being called with. Additionally, or alternatively, a number of infrequently used functions that take string IDs as arguments may exist. For example, a function for rendering CSS buttons may use such an approach. In this and other cases, the payments portal 102 can introduce a special function, called $str, that at runtime is defined as the identity function, which may do nothing. This can be accomplished, for example, by the function $str(id) {return id;}. When compiling the templates, this function can be used to collect the string IDs it is called with. Thus, for example, if the code includes the expression <% css_button($str("my_string_id")); %>, the payments portal 102 can determine that this code needs my_string_id. In one optimization, the call to $str can be removed entirely. It should be understood that this example is illustrative, and should not be construed as being limiting in any way.

Figures 13A, 13B, 13C:
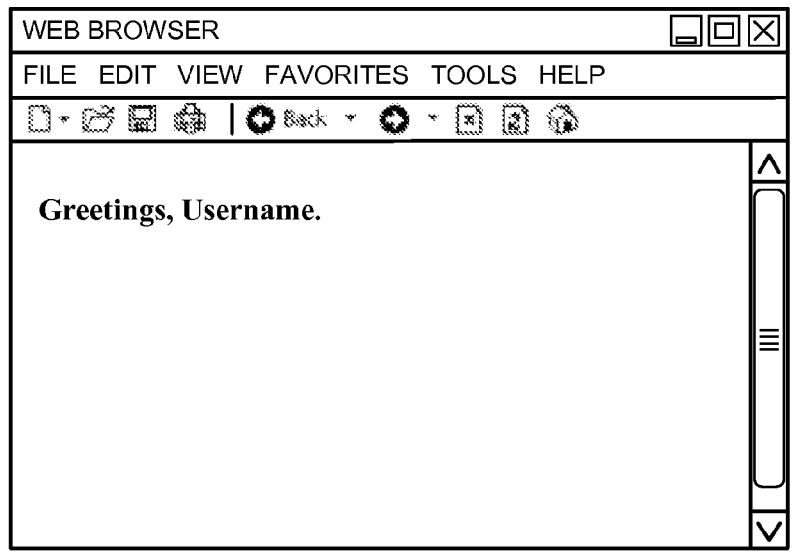
FIGS. 13A-C illustrate aspects of staged template compilation, according to one illustrative embodiment.

Turning now to FIGS. 13A-C, additional aspects of the payments portal 102 will be described in detail. In particular, some embodiments of the payments portal 102 can support staged template compilation. As noted above, the template system disclosed herein can be designed to run in browsers and on servers. This can be accomplished by compiling to JavaScript and having both JavaScript and Java runtime support. In the case of secret A/B tests, or the like, this approach can make certain testing and/or other releases difficult because some features may be tested prior to launch by putting the features behind an A/B test to control access. In particular, it may be undesirable to allow users or testers to view source code associated with a new feature. Thus, embodiments of the payments portal 102 use a staged template compilation. In some embodiments of the staged template compilation, the templates may do a first pass on the server, the result of which can be a "specialized template." This specialized template can be run safely in the browser to produce the actual HTML. Thus, embodiments of the concepts and technologies disclosed herein can be used to convert a pure template into a template and some HTML. An example block of code is shown in FIG. 13A.

In the example shown in FIG. 13A, the template directives using the $ character may run on the server, and the remaining template code may include only the code within % characters. It should be understood that that other characters, strings of characters, and/or other notations may be used, in some embodiments. In the above example shown in FIG. 13A, after processing the example code, a user may be left with a template that includes only the data included within the % characters, as shown in FIG. 13B. If the user viewing the screen display shown in FIG. 13B views the source code, the user may see code similar to the example shown in FIG. 13C. Thus, some embodiments of the payments portal can allow various entities to send JavaScript to the browser to finish running without risking discovery of sensitive source code. Furthermore, it can be appreciated that various embodiments of the concepts and technologies disclosed herein can convert the template with the HTML into pure HTML. Thus, embodiments can convert the pure template into the pure HTML via two or more steps or operations as described herein. It should be understood that this embodiment is illustrative, and should not be construed as being limiting in any way.

Some embodiments of the payments portal 102 can support templating. Data used by a particular widget 112 may be transformed to HTML for display. This processing can occur in a browser 120 in the case of dynamic widgets 112, for example by fetching data with an Ajax request. The processing also can occur on a server in the case of static widgets 112 where HTML is returned directly. While some UI components may be used exclusively in the browser 120 or the server, there may be components that rendered in both. To support processing in the browser 120, template languages that support JavaScript may be used. In some embodiments, JavaScript-based template languages executed via a JavaScript virtual machine implementation on the server may be used. The templates can use the JavaScript language for expressions and statements within the template. The payments portal 102 can be configured to use a template language that can be used to write widgets 112. This template language can support Cross-Site Scripting (XSS) protection, which can be built into the widgets 112 by default.

According to various implementations of this template language, a notion of expression output in the language can be supported. In some embodiments, the expression output can be written <%=expr %>. Thus, the template language used to support the payments portal 102 disclosed herein can be content type aware and can escape output by default. According to embodiments, if a developer or programmer determines that some output is not to be escaped, the output can be explicitly approved instead of the expression site. Thus, the template language can focus on the data itself, for example the content and/or the content type, instead of or in addition to a source from which the expression is output. Thus, embodiments of the concepts and technologies disclosed herein can be used to allow developers to have the same template where some of the data the template is emitting is already escaped and some of the data emitting is not escaped. A content-type awareness as disclosed herein can be useful as HTML can include sub-languages (e.g., CSS within HTML, JavaScript within HTML, a regular expression within JavaScript within HTML, or the like). Thus, the runtime environment for can support changing or pushing a sub-language within a nested scope.

The payments portal 102 also can support declarative metadata for localization. Some marketplaces may support localization of text using a string ID and images using an image ID, as noted above. As explained above, the payments portal 102 can use a process of resolving the string or image ID to the actually text in a particular language or the URL for an image. In server-side code, this can be done by making a call to fetch strings that are to be needed to render a page or widget 112 one time, and then looking up these strings later as needed. This approach can cause challenges as it may be difficult to programmatically determine, based upon a block of code, what string IDs may be needed. The payments portal 102 may be improved by being able to determine this information since the payments portal 102 can support pre-bundling of strings and may not be able to look the strings up at a later time. Similarly, it may be advantageous to determine what strings are to be localized before launching in a particular locale, among other similar localization considerations.

To accomplish this, the payments portal 102 can support allowing a metadata block in templates. The metadata block can declare a set of string IDs and image IDs that are to be needed. When the widget 112 is bundled (e.g., the templates, code, and the like are packaged), the payments portal 102 can compute the strings that the widget 112 may need.

The payments portal 102 also can support JavaScript syntax analysis for duplication-free metadata. The declarative metadata approach can pose a challenge in that a list of strings needed may need to be listed separately from the metadata block. This means that strings may be listed, and not actually needed, or strings may not be listed and may be needed. This issue can be addressed by the payments portal 102 disclosed herein by completing an abstract syntax tree (AST) traversal to identify calls to functions that actually use a string ID. For some functions that take a string ID as their argument, the strings can be examined directly. For example, <% text("my_string_id"); %> can output the value of my_string_id.

Thus, the AST traversal can be used to search the code for calls to this function and to collect the strings this function is being called with. Additionally, or alternatively, a number of infrequently used functions that take string IDs as arguments may exist. For example, a function for rendering CSS buttons may use such an approach. In this and other cases, the payments portal 102 can introduce a special function, called $str, that at runtime is defined as the identity function, which may do nothing. This can be accomplished, for example, by the function $str(id) {return id;}. When compiling the templates, this function can be used to collect the string IDs it is called with. Thus, for example, if the code includes the expression <% css_button($str("my_string_id")); %>, the payments portal 102 can determine that this code needs my_string_id. In one optimization, the call to $str can be removed entirely. It should be understood that this example is illustrative, and should not be construed as being limiting in any way.

The payments portal 102 also can support authentication and authorization. Calls to the payments portal 102 may be authenticated and authorized. Authentication and authorization can be provided for calls that are handled solely by the payment services 132, for example service calls to the APIs 110 to request a widget 112, calls to services that can authorize the initial caller, for example service calls to the APIs 110 to get payment plan details, calls to services that do not authorize the initial caller, for example, service calls to the APIs 110 to get details of the billing address of a payment instrument 138, calls combining multiple backing services, for example, a service can call the APIs 110 to register a new credit card with a new billing address.

The payments portal 102 also can support user-based authentication. When the API 110 is called from a browser 120, for example from JavaScript in a dynamic widget 112, the payments portal 102 may authenticate the calling user 124 directly. Even if the merchant site server 114 is authenticated, the call from the browser 120 may be examined separately. Due to browser same-origin policy for JavaScript, clients may proxy a payments portal 102 as part of their routing services 130 configuration. This means the payments portal 102 may have access to the same cookies on the Ajax calls as the merchant site server 114 would, and the payments portal 102 can authenticate the calling user 124 using the cookies.

When a client service uses cookies to authenticate users 124, the payment services can make a call to an authentication service with the cookies to authenticate the user 124 identity and to determine if the user 124 is considered logged in by the merchant site server 114. When calling a service that can handle user-based authorization, the payment services can pass the authenticated user ID as part of the request. The payments portal 102 also can support delegated authorization for users 124.

In some embodiments, resources of the payments portal 102 can be represented using JSON, including widgets 112. Thus, responses to requests for widgets 112 can include multiple pieces of data and JSON objects to identify the various pieces the merchant site server 114 are to include in a webpage 116. In addition, complex objects sent in POST and PUT requests can be represented using JSON. Benefits of using JSON for payments portal 102 use cases can include satisfying the payments portal 102 need to receive and provide structured data, without requiring a heavyweight schema, or a separate object-to-representation mapping to conversion between data and the document object model ("DOM"), for example. JSON objects also can be understood and generated by browsers, which may support JSON natively.

Limiting payments portal 102 data to a single type can simplify the payments portal 102 by eliminating the need to properly handle HTTP content negotiation. In the case of static widgets 112, however, the widget 112 can be embedded in a webpage 116 hosted by a merchant site server 114, and links or forms within the widget 112 can reference resources of the merchant site server 114. Forms, in particular, can submit data to the merchant site server 114 using form-encoded or multipart mechanisms. The merchant site server 114 can extract the portal data fields from the form and assemble the portal data fields into a JSON data object to be sent to a payments portal 102 resource.

Customization of the widgets 112 can be completed for static and dynamic widgets 112. For these reasons, a request from a merchant site server 114 for a type of widget 112 may include a locale and a widget context. The widget context may include a client identifier, an organization unit, a business unit, a marketplace, and/or other information. The returned widget 112 can be customized. For example, styling of the widget 112 can be overridden in the webpage 116 by merchant site servers 114, if desired. Other types of widget 112 customization may be specified via parameters that the merchant site server 114 can pass to the payments portal 102 in the widget 112 request. These parameters may include the URI of the embedding page, URIs of data resources to be displayed within the widget 112, references to the handlers for various events and/or other elements that can vary across pages within a single pipeline.

It should be understood that additional values may also be included in the widgets 112. These values may include SCRIPT tags to include in the HEAD of the containing page, metadata describing the widget 112, and/or HTTP headers to be added to the response with the webpage 116. It should be understood that SCRIPT tags may reference JavaScript source files resources to be loaded by the browser 120, though some widgets 112 may also include inline JavaScript. Some elements of the above data may be contained in a JavaScript Object Notation ("JSON") object corresponding to the response body. Some metadata may be returned in the HTTP headers of the response. The response body also may contain one or more blocks of HTML and/or JavaScript to be included on the webpage 116.

The payments portal 102 also can be configured to handle external requests using routing provided by the routing services 130. In some cases, such as Ajax requests, a request from the browser 120 may be handled directly by the payments portal 102. This request may be handled in the routing services 130 with re-write rules. The payments portal 102 may maintain a package of configuration files included in the multi-tenant routing services 130 environment. When integrating with the payments portal 102, merchant site servers 114 can include this configuration to delegate the selected portion of their URL space.

The use of the routing services 130 can have benefits. For example, the routing services 130 can address the same origin policy of some browsers 120 for Ajax requests by delegating a portion of the hosting website URL space. Also, the payments portal 102 can manage encrypting form fields containing sensitive data. There also may be little change to dispatch overhead as these requests route through the routing services 130 in either case. Also, by using common configuration files in the multi-tenant fleet, the payments portal 102 team can manage routing changes within the delegated URL space without necessarily requiring clients to update their code or configuration.

Figure 14:
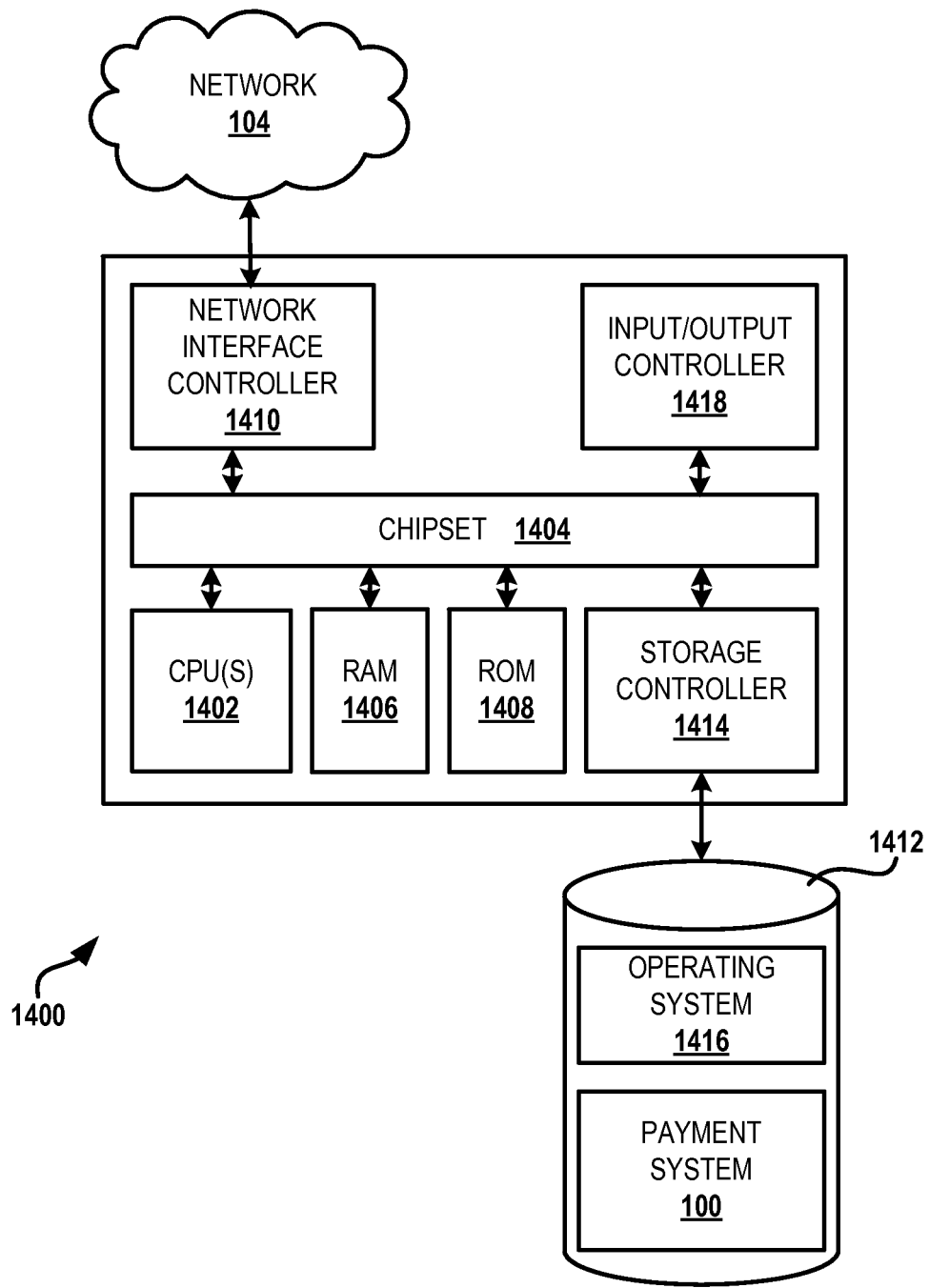
FIG. 14 is a computer architecture diagram showing an illustrative computer hardware architecture for implementing the various computing devices described in embodiments presented herein.

FIG. 14 shows an example computer architecture for a computer 1420 capable of executing the software components described herein for providing a payments portal. The computer architecture shown in FIG. 14 illustrates a conventional server computer, workstation, desktop computer, laptop, network appliance, personal digital assistant ("PDA"), e-reader, digital cellular phone, or other computing device and may be utilized to execute any aspects of the software components presented herein described as executing within computing devices mentioned herein.

It also should be understood that the concepts and technologies disclosed herein for a payments portal can be implemented on a distributed (e.g., "cloud") computing platform. As such, it should be understood that the computer 1420 can execute part or all of the described functionality and/or that the described functionality can be distributed across a number of computing platforms that are similar to, identical to, and/or different from the computer 1420 shown in FIG. 14.

The computer 1420 includes a baseboard, or "motherboard," which is a printed circuit board to which a multitude of components or devices may be connected by way of a system bus or other electrical communication paths. In one illustrative embodiment, one or more central processing units ("CPUs") 1422 operate in conjunction with a chipset 1424. The CPUs 1422 are standard programmable processors that perform arithmetic and logical operations necessary for the operation of the computer 1420.

The CPUs 1422 perform the necessary operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 1424 provides an interface between the CPUs 1422 and the remainder of the components and devices on the baseboard. The chipset 1424 may provide an interface to a random access memory ("RAM") 1426, used as the main memory in the computer 1420. The chipset 1424 may further provide an interface to a computer-readable storage medium such as a read-only memory ("ROM") 1428 or non-volatile RAM ("NVRAM") for storing basic routines that help to startup the computer 1420 and to transfer information between the various components and devices. The ROM 1428 or NVRAM may also store other software components necessary for the operation of the computer 1420 in accordance with the embodiments described herein.

The computer 1420 may operate in a networked environment using logical connections to remote computing devices and computer systems through the network 1423. The chipset 1424 may include functionality for providing network connectivity through a network interface controller ("NIC") 1410, such as a gigabit Ethernet adapter. The NIC 1410 is capable of connecting the computer 1420 to other computing devices over the network 1423. It should be appreciated that multiple NICs 1410 may be present in the computer 1420, connecting the computer to other types of networks and remote computer systems.

The computer 1420 may be connected to a mass storage device 1412 that provides non-volatile storage for the computer. The mass storage device 1412 may store system programs, application programs, other program modules and data, which have been described in greater detail herein. The mass storage device 1412 may be connected to the computer 1420 through a storage controller 1414 connected to the chipset 1424. The mass storage device 1412 may consist of one or more physical storage units. The storage controller 1414 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1420 may store data on the mass storage device 1412 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1412 is characterized as primary or secondary storage and the like.

For example, the computer 1420 may store information to the mass storage device 1412 by issuing instructions through the storage controller 1414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1420 may further read information from the mass storage device 1412 by detecting the physical states or characteristics of one or more particular locations within the physical storage units.

In addition to the mass storage device 1412 described above, the computer 1420 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 1420. As mentioned above, it should be understood that the mass storage device 1412 can be provided by multiple computing devices and/or storage devices in a distributed computing environment. As such, the mass storage device 1412 is one example of a possible storage device and should not be construed as being limiting in any way.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1412 may store an operating system 1416 utilized to control the operation of the computer 1420. According to one embodiment, the operating system includes a member of the LINUX family of operating systems. According to another embodiment, the operating system includes a member of the WINDOWS® SERVER family of operating systems from MICROSOFT Corporation in Redmond, Wash. According to further embodiments, the operating system may include a member of the UNIX or SOLARIS families of operating systems. It should be appreciated that other operating systems may also be utilized. The mass storage device 1412 may store other system or application programs and data utilized by the computer 1420 such as various widgets, payment plans, payment preferences, web content, combinations thereof, or the like.

In one embodiment, the mass storage device 1412 or other computer-readable storage media is encoded with computer-executable instructions that, when loaded into the computer 1420, transform the computer from a general-purpose computing system into a special-purpose computer capable of implementing the embodiments described herein. These computer-executable instructions transform the computer 1420 by specifying how the CPUs 1422 transition between states, as described above. According to one embodiment, the computer 1420 has access to computer-readable storage media storing computer-executable instructions that, when executed by the computer 1420, perform aspects of various methods and/or flows illustrated herein with reference to FIGS. 3-11. As shown in FIG. 14, the mass storage device 1412 also can store logic and/or code for providing the payments portal 102 and/or other components of the payment system 100 (or a portion or portions thereof) described herein. The mass storage device 1412 also can store one or more of the widgets 112 described herein, though these are not shown in FIG. 14. Because other data described herein can be stored in the mass storage device 1412, it should be understood that the illustrated embodiment is illustrative and should not be construed as being limiting in any way.

The computer 1420 may also include an input/output controller 1418 for receiving and processing input from a number of input devices, such as a keyboard, a mouse, a touchpad, a touch screen, an electronic stylus, or other type of input device. Similarly, the input/output controller 1418 may provide output to a display, such as a computer monitor, a flat-panel display, a digital projector, a printer, a plotter, or other type of output device. It will be appreciated that the computer 1420 may not include all of the components shown in FIG. 14, may include other components that are not explicitly shown in FIG. 14, or may utilize an architecture completely different than that shown in FIG. 14.

Based on the foregoing, it should be appreciated that technologies for a payments portal have been presented herein. Although the subject matter presented herein has been described in language specific to computer structural features, methodological acts and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

EXAMPLES

1. A computer-implemented method for conducting a payment transaction, the method comprising computer-implemented operations for:

accessing, at a computing device executing a browser, a webpage hosted by a merchant site server, wherein the merchant site server is associated with a marketplace;

detecting, at the browser, an interaction with the webpage, the interaction for launching a payment transaction;

requesting, from the merchant site server, a further webpage containing a widget for performing at least part of the payment transaction;

receiving, from the merchant site server, the further webpage containing the widget, the widget being fetched by the merchant server from a payments portal in communication with the merchant site server;

detecting, at the browser, a further interaction with the widget;

passing control, by the computing device, to the widget to begin fulfillment of the request;

fetching, via execution of code included in the widget, updated payments data from the payments portal, the updated payments data defining a next iteration of the widget;

rendering, by the computing device, the next iteration of the widget, the next iteration of the widget including the updated payments data embedded in the webpage;

in response to detecting an interaction with the next iteration of the widget, accessing, by the next iteration of the widget, a payments portal to perform the at least part of the payment transaction; and returning control, by the next iteration of the widget, to the computing device.

2. The method of example 1, wherein the widget comprises a dynamic widget, and wherein the dynamic widget comprises hypertext markup language and executable scripting code.

3. The method of examples 1-2, wherein the next iteration of the widget comprises a dynamic widget, and wherein the next iteration of the widget comprises hypertext markup language code and executable scripting code.

4. The method of examples 1-3, wherein accessing the payments portal comprises generating a request and sending the request to the payments portal via routing services associated with both the merchant site server and the payments portal.

5. The method of examples 1-4, wherein accessing the payments portal further comprises obtaining data from payment services in communication with the payments portal, the payment services comprising services for obtaining at least one of payment plans, payment methods, payment instruments, loyalty information, rewards information, promotions information, non-payments data, address information, or preferences.

6. The method of examples 1-5, wherein the payments portal is configured to receive a request for a widget, to access data hosted by payment services or other services, and to generate the widget based upon the data.

7. The method of examples 1-6, wherein the widget is configured to fetch data hosted by payment services or other services, and to update the widget based upon the data.

8. The method of examples 1-7, wherein fetching the next iteration of the widget comprises indicating, with the request for the next iteration of the widget, a version associated with the widget, and wherein the next iteration of the widget is a same version as the widget.

9. A computer-implemented method for fulfilling a request for a webpage, the method comprising computer-implemented operations for:
    accessing, at a computing device executing a browser, a webpage hosted by a merchant site server;
    detecting, at the browser, an interaction for initiating the request;
    receiving, from the merchant site server, a webpage containing a widget for fulfilling at least part of the request, the widget being obtained by the merchant site server from a payments portal;
    receiving, from the merchant site server, a further webpage comprising the widget;
        if the widget comprises a static widget,
        indicating, to the merchant site server, that an interaction with the widget initiated a subsequent request,
        receiving, from the merchant site server, a webpage containing a next iteration of the widget, the next iteration of the widget being obtained by the merchant site server from a payments portal, or
        allowing control to pass from the payments portal to the merchant site server if the payments portal has fulfilled at least part of the request; and if the widget comprises a dynamic widget,
        detecting, at the browser, a further interaction with the widget,
        passing control, by the computing device, to the dynamic widget to begin fulfillment of the request,
        accessing, by the computing device via execution of code included in the dynamic widget, the payments portal to fulfill the at least part of the request, and
        returning control, by the dynamic widget, to the computing device.

10. The method of example 9, wherein if the widget comprises the dynamic widget, the dynamic widget comprises hypertext markup language and executable scripting code that, when executed by the browser, causes the browser to access the payments portal in response to detected interactions at the computing device.

11. The method of examples 9-10, further comprising:
    in response to detecting an interaction with the dynamic widget, accessing the payments portal to perform the at least part of the request, by
        fetching, from the payments portal, updated payments data, the updated payments data defining a next iteration of the widget; and
        updating the widget within the webpage.

12. The method of examples 9-11, wherein if the widget comprises the static widget, the static widget comprises hypertext markup language and does not rely on executing scripting code in a browser.

13. The method of examples 9-12, further comprising:
    requesting, from the payments portal, an updated widget comprising a next iteration of the static widget;
    receiving, from the merchant site server, an updated page containing the next iteration of the widget; and
    in response to detecting an interaction with the updated page, accessing the payments portal to perform the at least part of the request.

14. The method of examples 9-13, wherein a new version of hypertext markup language or executable scripting code comprising the widget is returned without requiring modifications to the merchant site server.

15. A payment system comprising:
    a merchant site server in communication with a payments portal, the merchant site sever hosting a webpage associated with a marketplace, wherein the payments portal comprises a widget construction module, and wherein the payments portal exposes a hypertext transfer protocol application programming interface via which calls to the payments portal are received;
    routing services for routing requests from a computing device to the payments portal, wherein the routing services route requests from the computing device to a payment service behind a firewall associated with the marketplace, and wherein the requests are generated by a widget embedded in a webpage rendered by a browser executed by the computing device; and
    payment services for accessing at least one of payment plans, payment methods, payment instruments, loyalty information, rewards information, promotions information, non-payments data, address information, or preferences associated with payments for use in fulfilling at least part of a request using the widget.

16. The system of example 15, further comprising merchant systems in communication with the merchant site server, wherein the widgets enable fulfillment of the at least part of the request without accessing the merchant systems.

17. The system of examples 15-16, wherein the payments portal exposes an application programming interface, and wherein the application programming interface comprises a hypertext transfer protocol application programming interface that supports representational state transfer communications between the widget and the payments portal.

18. The system of examples 15-17, wherein the payments portal hosts an authentication module for authenticating and authorizing requests received at the payments portal.

19. The system of examples 15-18, wherein if the widget comprises a dynamic widget, the widget includes executable code obtained by the browser, and wherein interactions with the widget causes the executable code to exchange data with the payments portal and re-render the widget in an updated state on the same web page; and wherein if the widget comprises a static widget, an interaction with the widget causes the browser to request another web page and to obtain an updated webpage with an updated iteration of the widget to use to fulfill the request.

20. A computer readable medium having stored thereon computer executable instructions that, when executed by a computer, cause the computer to execute operations comprising:

accessing a webpage hosted by a merchant site server;

detecting an interaction for fulfilling at least part of a request;

receiving, from the merchant site server, a webpage containing a widget for fulfilling the at least part of the request, the widget being obtained by the merchant site server from a payments portal;

receiving, from the merchant site, a further webpage comprising the widget;

detecting, at a browser, a further interaction with the widget;

if the widget comprises a static widget, accessing the payments portal to fulfill at least part of the request; and if the widget comprises a dynamic widget, passing control to the dynamic widget to begin fulfillment of the request;

accessing, via execution of code included in the dynamic widget, the payments portal to fulfill the at least part of the request; and returning control from the dynamic widget to the webpage.

21. The computer readable medium of example 20, wherein the computer executable instructions further comprise instructions that, when executed by the computer, cause the computer to execute operations further comprising:

fetching, from the payments portal, an updated widget, the updated widget comprising a next iteration of the widget;

obtaining the further webpage, the further webpage containing the updated widget; and in response to detecting an interaction with the updated widget, accessing the payments portal to fulfill the at least part of the request.

22. A computer-implemented method for building a widget for conducting a payment transaction, the method comprising computer-implemented operations for:

receiving, at a payments portal executing a widget construction module, a request for a widget to be used to conduct the payment transaction, the request being received from a merchant site hosting a webpage;

determining, at the payments portal, contents of the widget, data to be included with the widget, and widget templates to be used to generate the widget;

generating, at the payments portal, the widget using a widget template language;

packaging, at the payments portal, the widget and the data; and providing, by the payments portal, the widget and the data to the merchant site for embedding in the webpage, wherein the widget is configured to be updated within the webpage, if the widget comprises a dynamic widget, or to refresh the webpage if the widget comprises a static widget.

23. The method of example 22, wherein the widget template language supports localization of images and strings to be included in the widget.

24. The method of examples 22-23, further comprising:

obtaining a metadata block associated with the widget, the metadata block identifying the images and the strings; and localizing the images and the strings to obtain localized images and localized strings, wherein providing the widget comprises providing the widget and the localized images the localized strings.

25. The method of examples 22-24, further comprising performing an abstract syntax tree traversal of a template to extract a list of strings and images to be localized.

26. The method of examples 22-25, wherein performing the abstract syntax tree traversal comprises identifying functions in the widget that use a string identifier as an argument, and collecting a list of the strings called by the functions.

27. The method of examples 22-26, wherein performing the abstract syntax tree traversal comprises introducing a special function that takes a string identifier as an argument, defining, at runtime, the special function as an identity function, and collecting, during compiling of the widget, string identifiers called with the special function.

28. The method of examples 22-27, wherein the widget comprises a script and hypertext markup language code, and wherein the template language supports cross-site scripting protection by escaping output from function calls within the script by default.

29. The method of examples 22-28, wherein the widget template language supports staged template compilation, wherein supporting the staged template compilation comprises defining a first marker used to define a first portion of code to be hidden from a browser, and defining a second marker used to define a second portion of code to be visible at the browser, and wherein generating the contents of the widget comprises locating the first portion the code within two instances of the first marker and executing the first portion of the code on the payments portal, and locating the second portion of the code within two instances of the second marker, and including the second portion of the code in a web page to be executed in a browser.

30. A computer-implemented method for building a widget for conducting a transaction, the method comprising computer-implemented operations for:

receiving, at a computer executing a widget construction module, a request for a widget to be used to support a transaction at a computing device, the request being received from a server hosting a webpage;

determining, at the computer, contents of the widget, data to be included with the widget, and a widget template to be used to generate the widget;

generating, at the computer, the widget using a widget template language;

packaging, at the computer, the widget and the data; and providing, by the computer, the widget and the data to the server for embedding in the webpage, wherein the widget is configured to be updated within the webpage, if the widget comprises a dynamic widget, or to refresh the webpage if the widget comprises a static widget.

31. The method of example 30, wherein generating the widget comprises generating hypertext markup language and executable scripting code using the widget template language.

32. The method of examples 30-31, further comprising:
obtaining a metadata block associated with the widget, the metadata block identifying images and strings to be included with the widget; and
localizing the images and the strings to obtain localized images and localized strings, wherein providing the widget comprises providing the widget and the localized images the localized strings.

33. The method of examples 30-32, wherein the widget comprises hypertext markup language code and executable scripting code, and wherein the template language is configured to escape, by default, output from function calls within the executable scripting code.

34. The method of examples 30-33, wherein the widget comprises code, wherein the widget template language supports staged template compilation of the code, and wherein the staged template compilation comprises modifying the code to
remove a first portion of the code before providing the widget to a computing device that is to render the widget to prevent viewing of the first portion of the code, and
not remove a second portion of the code before providing the widget to the computing device, wherein the second portion of the code is viewable at the computing device.

35. The method of examples 30-34, wherein the transaction comprises a payment transaction, wherein the computer comprises a payments portal, and wherein the server comprises a merchant site associated with a marketplace comprising the payments portal.

36. A payment system comprising:
a payments portal comprising a computer executing a widget construction module and exposing a hypertext transfer protocol application programming interface via which calls to the payments portal are received; and
a merchant site in communication with a payments portal and hosting a webpage associated with a marketplace, wherein the payments portal is configured to
receive a call via the hypertext transfer protocol application programming interface, the call comprising a request for a widget to conduct a payment transaction,
determine contents of the widget, data to be included with the widget, and a widget template to be used to generate the widget,
generate the widget using a widget template written in a widget template language,
package the widget and the data, and
provide the widget and the data to a merchant site server for embedding in the webpage, wherein the widget is configured to be updated within the webpage, if the widget comprises a dynamic widget, or to refresh the webpage if the widget comprises a static widget.

37. The system of example 36, wherein the widget template language enables the widget construction module to
obtain a metadata block associated with the widget, the metadata block identifying images and strings to be accessed by the widget; and
localize the images and the strings to obtain localized images and localized strings, wherein providing the widget comprises providing the widget and the localized images and localized strings to the server, wherein to localize the images and the strings, the widget construction module is configured to translate at least one of the images or the strings.

38. The system of examples 36-37, wherein the widget comprises hypertext markup language code and a script, and wherein the template language supports cross-site scripting protection by escaping output by default from function calls within the script.

39. The system of examples 36-38, wherein the template language comprises a syntax that distinguishes between first stage code and second stage code, wherein the widget comprises executable code, and wherein the widget construction module is configured to modify the code to
remove, from the widget, a first portion of the code between a first marker and a second marker included in the code, the first marker and the second marker for defining the first stage code, and to
include, in the widget, a second portion of code between a third marker and a fourth marker included in the code, the third marker and the fourth marker for defining the second stage code.

40. A computer readable medium having stored thereon computer executable instructions that, when executed by a computer, cause the computer to execute operations comprising:
receive a request for a widget to support a web payment transaction, the request being received from a merchant site server hosting a webpage;
determine a content of the widget, data to be included with the widget, and a widget template to be used to generate the widget, the widget template being written in a widget template language;
generate the widget based upon the widget template;
package the widget and the data; and
provide the widget and the data to the merchant site for embedding in the webpage, wherein the widget is configured to be updated within the webpage, if the widget comprises a dynamic widget, or to refresh the webpage if the widget comprises a static widget.

41. The computer readable medium of example 40, wherein the widget template language is configured to
use a block of declarative metadata to define strings and images to be accessed by a widget,
localize at least one of the strings or the images to be accessed by the widget,
support cross site scripting protection by escaping, by default, output from function calls included in a script of the widget, and
enable staged compilation of the widget by modifying code included in the widget to include or exclude a portion of code in the widget before providing the widget to a browser.

42. A computer-implemented method for conducting a payment transaction, the method comprising computer-implemented operations for:
detecting, at a merchant site server hosting a webpage, a request for the webpage for use in the payment transaction;
fetching, by the merchant site server, a static widget for performing at least part of the payment transaction, wherein the static widget comprises hypertext markup language code;
embedding, by the merchant site server, the static widget in a webpage;
providing, by the merchant site server, the webpage to a computer system in communication with the merchant site;
detecting, by the merchant site server, an interaction at the computer system;
determining, by the merchant site server, that the interaction is occurring with the static widget;
collecting, by the merchant site server, information associated with the interaction;

accessing, by the merchant site server, a payments portal to access a next iteration of the widget; and providing, by the merchant site server, the next iteration of the webpage containing the next iteration of the widget to the computer system.

43. The method of example 42, wherein accessing the merchant site server comprises accessing the payments portal via a hypertext transfer protocol application programming interface.

44. The method of examples 42-43, further comprising:
receiving, in response to requesting an update, an updated static widget;
embedding the updated static widget in an updated webpage; and
providing the updated webpage to the computer system.

45. The method of examples 42-44, wherein the computer system does not support execution of scripts or wherein the computer system is configured to block execution of scripts in the static widget.

46. The method of examples 42-45, wherein the payments portal is configured to receive a request for the static widget, to access data hosted by payment services, and to generate the static widget based, at least partially, upon the data.

47. The method of examples 42-46, wherein fetching the static widget comprises including, with the request for the static widget, a version, and wherein the static widget is a same version as the version indicated with the request.

48. The method of examples 42-47, wherein the static widget comprises a script, and wherein the static widget executes at least part of the transaction without execution of the script.

49. The method of examples 42-48, wherein responding with the next iteration of the widget comprises responding with data indicating that the widget has fulfilled a portion of the request.

50. A computer-implemented method for conducting a transaction, the method comprising computer-implemented operations for:
detecting, at a server hosting a webpage, a request for a static widget for use in a payment transaction;
fetching, by the server, the static widget for performing at least part of the payment transaction, wherein the static widget comprises hypertext markup language code, and wherein the static widget is generated by a payments portal in communication with the server;
embedding, by the server, the static widget in a webpage;
providing, by the server, the webpage to a computer system in communication with the server;
detecting, by the server, an interaction with the static widget;
accessing, by the server, a payments portal to obtain a next iteration of the static widget; and
provide, by the server, the next iteration of the static widget to be embedded in a further webpage to be displayed in a browser.

51. The method of example 50, further comprising in response to detecting the interaction with the static widget, accessing the payments portal via a hypertext transfer protocol application programming interface, and requesting an update of the static widget.

52. The method of examples 50-51, further comprising:
receiving, from the payments portal, an updated static widget;
embedding the updated static widget in an updated webpage; and
providing the updated webpage to the computer system.

53. The method of examples 50-52, wherein providing the updated webpage comprises instructing the computer system, via code included in the webpage, to obtain the updated webpage.

54. The method of examples 50-53, wherein the computer system comprises a device that does not support execution of scripts.

55. The method of examples 50-54, wherein the device comprises a mobile communications device that does not support execution of scripts.

56. The method of examples 50-55, further comprising:
requesting, from the payments portal, an updated static widget comprising a next iteration of the static widget;
receiving, from the payments portal, an updated webpage corresponding to the next iteration of the static widget; and
providing the next iteration of the static widget to the computer system.

57. A computer readable medium having stored thereon computer executable instructions that, when executed by a computer, cause the computer to execute operations comprising:
detecting a request for a static widget for conducting at least a portion of a payments transaction;
fetching the static widget for performing at least part of the payment transaction, wherein the static widget comprises hypertext markup language code;
embedding the static widget in a webpage;
providing the webpage to a computer system in communication with the server;
detecting an interaction with the static widget;
accessing a payments portal to obtain a next iteration of the static widget; and
provide the next iteration of the static widget to be embedded in a further webpage to be displayed in a browser executed by a computer system.

58. The computer readable medium of example 57, wherein the computer system is configured to view the further webpage by refreshing a view of the webpage.

59. The computer readable medium of examples 57-58, wherein the computer system comprises an e-reader that does not support execution of scripts.

60. The computer readable medium of examples 57-59, wherein the computer system comprises a mobile communications device that blocks execution of scripts, wherein the static widget comprises a script, and wherein the static widget does not rely upon the script to provide functionality associated with the static widget.

61. The computer readable medium of examples 57-60, wherein the static widget comprises a script, and wherein the widget executes at least part of the transaction without execution of the script.

62. The computer readable medium of examples 57-61, wherein the payments portal is configured to provide dynamic widgets to a device in communication with the payments portal, the dynamic widgets comprising a script.

What is claimed is:
1. A computer-implemented method, comprising:
receiving, at a portal including one or more first computing devices executing a widget construction module, a request for a widget to be used to conduct a payment transaction, the request received from a site including one or more second computing devices hosting a webpage, wherein the request includes one or more parameters that specify one or more customizations to the widget, wherein the one or more parameters include one or more of an identifier of the webpage to embed the widget or an identifier of an event handler associated with one or more events of the payment transaction;

at least partly in response to receiving the request, determining, using the one or more first computing devices at the portal, contents of the widget, data to be included with the widget and widget templates to be used to generate the widget based at least, in part, on the one or more parameters and an interaction with the webpage hosted by the one or more second computing devices of the site;

after determining one or more of the contents of the widget, the data to be included with the widget or the widget templates to be used to generate the widget, generating the widget using a widget template language using the widget construction module executing on the one or more first computing devices of the portal;

at least partly in response to generating the widget, packaging, at the portal, the widget and the data; and providing, from the one or more first computing devices of the portal to the one or more second computing devices of the site, the widget and the data for embedding in the webpage by the one or more second computing devices of the site, wherein the widget is configured to be updated by the one or more first computing devices of the portal.

2. The method of claim 1, wherein the widget template language supports localization of images and strings to be included in the widget.

3. The method of claim 2, further comprising:
obtaining a metadata block associated with the widget, the metadata block identifying the images and the strings; and
localizing the images and the strings to obtain localized images and localized strings, wherein providing the widget comprises providing the widget and the localized images the localized strings.

4. The method of claim 3, further comprising performing an abstract syntax tree traversal of a template to extract a list of strings and images to be localized.

5. The method of claim 4, wherein performing the abstract syntax tree traversal comprises
identifying functions in the widget that use a string identifier as an argument, and
collecting a list of the strings called by the functions.

6. The method of claim 4, wherein performing the abstract syntax tree traversal comprises
introducing a special function that takes a string identifier as an argument,
defining, at runtime, the special function as an identity function, and
collecting, during compiling of the widget, string identifiers called with the special function.

7. The method of claim 1, wherein the widget comprises a script and hypertext markup language code, and wherein the template language supports cross-site scripting protection by escaping output from function calls within the script by default.

8. The method of claim 1, wherein
the widget template language supports staged template compilation,
wherein supporting the staged template compilation comprises defining a first marker used to define a first portion of code to be hidden from a browser, and defining a second marker used to define a second portion of code to be visible at the browser, and wherein generating the contents of the widget comprises locating the first portion the code within two instances of the first marker and executing the first portion of the code on the portal, and
locating the second portion of the code within two instances of the second marker, and including the second portion of the code in a web page to be executed in a browser.

9. A computer-implemented method, comprising:
receiving, at a portal including one or more first computers executing a widget construction module, a request for a widget to be used to support a transaction at a computing device, the request received from a site including one or more second computers hosting a webpage, and wherein the request includes one or more parameters that specify one or more customizations to the widget, wherein the one or more parameters include one or more of an identifier of the webpage or an identifier of an event handler associated with one or more events of the payment transaction;
determining, at the one or more first computers of the portal, contents of the widget, data to be included with the widget, and a widget template to be used to generate the widget;
generating, via the widget construction module executing on at the one or more first computers of the portal, the widget using a widget template language;
packaging, at the one or more first computers, the widget and the data; and
providing, by the one or more first computers of the portal, the widget and the data to the site for embedding in the webpage by the merchant site, wherein the widget is configured to be updated within the webpage by the portal.

10. The method of claim 9, wherein generating the widget comprises generating hypertext markup language and executable scripting code using the widget template language.

11. The method of claim 9, further comprising:
obtaining a metadata block associated with the widget, the metadata block identifying images and strings to be included with the widget; and
localizing the images and the strings to obtain localized images and localized strings, wherein providing the widget comprises providing the widget and the localized images the localized strings.

12. The method of claim 9, wherein the widget comprises hypertext markup language code and executable scripting code, and wherein the template language is configured to escape, by default, output from function calls within the executable scripting code.

13. The method of claim 9, wherein the widget comprises code, wherein the widget template language supports staged template compilation of the code, and wherein the staged template compilation comprises modifying the code to
remove a first portion of the code before providing the widget to a computing device that is to render the widget to prevent viewing of the first portion of the code, and
not remove a second portion of the code before providing the widget to the computing device, wherein the second portion of the code is viewable at the computing device.

14. The method of claim 9, wherein the widget is used to support.

15. A payment system comprising:
a portal comprising one or more first computers executing a widget construction module and exposing a hypertext transfer protocol application programming interface via which calls to the portal are received; and a site, including one or more second computers, in communication with the portal and the site hosting a webpage associated with a marketplace, wherein the one or more first computers of the portal are configured to receive a call via the hypertext transfer protocol application programming interface, the call comprising a request for a widget to embed within a webpage at the site to conduct a payment transaction, wherein the request includes one or more parameters that specify one or more customizations to the widget, wherein the one or more parameters include one or more of an identifier of the webpage or an identifier of an event handler associated with one or more events of the payment transaction, determine contents of the widget, data to be included with the widget, and a widget template to be used to generate the widget, generate the widget using a widget template written in a widget template language, package the widget and the data, and provide the widget and the data to at least one of the one or more of the second computers of the site for embedding in the webpage by the site, wherein the widget is configured to be updated within the webpage by the portal.

16. The system of claim 15, wherein the widget template language enables the widget construction module to obtain a metadata block associated with the widget, the metadata block identifying images and strings to be accessed by the widget; and localize the images and the strings to obtain localized images and localized strings, wherein providing the widget comprises providing the widget and the localized images and localized strings to the computer, wherein to localize the images and the strings, the widget construction module is configured to translate at least one of the images or the strings.

17. The system of claim 15, wherein the widget comprises hypertext markup language code and a script, and wherein the template language supports cross-site scripting protection by escaping output by default from function calls within the script.

18. The system of claim 15, wherein the template language comprises a syntax that distinguishes between first stage code and second stage code, wherein the widget comprises executable code, and wherein the widget construction module is configured to modify the code to remove, from the widget, a first portion of the code between a first marker and a second marker included in the code, the first marker and the second marker for defining the first stage code, and to include, in the widget, a second portion of code between a third marker and a fourth marker included in the code, the third marker and the fourth marker for defining the second stage code.

19. A non-transitory computer readable medium having stored thereon computer executable instructions that, when executed by one or more processors, cause the computer to:

receive a request for a widget to support a web payment transaction, the request received from a site computer hosting a webpage, wherein the request includes one or more parameters that specify one or more customizations to the widget, wherein the one or more parameters include one or more of an identifier of the webpage or an identifier of an event handler associated with one or more events of the payment transaction, and wherein the site computer is different from the computer;

determine a content of the widget, data to be included with the widget, and a widget template to be used to generate the widget, the widget template being written in a widget template language;

generate the widget based upon the widget template;

package the widget and the data; and provide the widget and the data to the site computer for embedding in the webpage by the site computer, wherein the widget is configured to be updated within the webpage by the computer.

20. The non-transitory computer readable medium of claim 19, wherein the widget template language is configured to use a block of declarative metadata to define strings and images to be accessed by a widget, localize at least one of the strings or the images to be accessed by the widget, support cross site scripting protection by escaping, by default, output from function calls included in a script of the widget, and enable staged compilation of the widget by modifying code included in the widget to include or exclude a portion of code in the widget before providing the widget to a browser.

* * * * *